(12) United States Patent
Njiende et al.

(10) Patent No.: US 10,389,258 B2
(45) Date of Patent: Aug. 20, 2019

(54) INTEGRATED MAGNETIC COMPONENT AND POWER CONVERTER

(71) Applicant: Delta Electronics (Thailand) Public Co., Ltd., Samutprakarn (TH)

(72) Inventors: Hugues Douglas Njiende, Paderborn (DE); Osman Erinc, Hamm (DE); Daniel Ruff, Bad Wünnenberg-Haaren (DE)

(73) Assignee: DELTA ELECTRONICS (THAILAND) PUBLIC COMPANY LIMITED, Samutprakarn (TH)

( * ) Notice: Subject to any disclaimer, the term of this patent is extended or adjusted under 35 U.S.C. 154(b) by 0 days.

(21) Appl. No.: 15/973,139

(22) Filed: May 7, 2018

(65) Prior Publication Data

US 2018/0323720 A1 Nov. 8, 2018

(30) Foreign Application Priority Data

May 8, 2017 (EP) .................................. 17169944

(51) Int. Cl.
| | | |
|---|---|---|
| H01F 27/28 | (2006.01) | |
| H01F 27/40 | (2006.01) | |
| H01F 27/02 | (2006.01) | |
| H02M 3/335 | (2006.01) | |
| H02M 3/337 | (2006.01) | |

(Continued)

(52) U.S. Cl.
CPC .......... H02M 3/33569 (2013.01); H01F 3/14 (2013.01); H01F 27/24 (2013.01);
(Continued)

(58) Field of Classification Search
CPC .. H02M 7/523; H02M 3/33569; H02M 3/337; H02M 2001/0058; H01F 27/24; H01F 27/2823; H01F 3/14; H01F 27/346
See application file for complete search history.

(56) References Cited

U.S. PATENT DOCUMENTS

| | | | | |
|---|---|---|---|---|
| 5,555,494 A | * | 9/1996 | Morris | ................ H02M 3/337 363/132 |
| 2008/0224809 A1 | * | 9/2008 | Zhang | ..................... H01F 3/12 336/170 |

(Continued)

FOREIGN PATENT DOCUMENTS

| | | |
|---|---|---|
| CN | 103107704 A | 5/2013 |
| EP | 2 461 334 A1 | 6/2012 |
| EP | 3 133 614 A1 | 2/2017 |

OTHER PUBLICATIONS

Jang, et al., Average Current Mode Control to Improve Current Distributions in Multi-Module Resonant DC-To-DC Converters, 8th International Conference on Power Electronics—ECCE Asia, May 30, 2011, pp. 2312-2319.

(Continued)

*Primary Examiner* — Gary L Laxton
*Assistant Examiner* — Sisay G Tiku
(74) *Attorney, Agent, or Firm* — Vector IP Law Group LLC; Robert S. Babayi

(57) ABSTRACT

The invention relates to an integrated magnetic component (802) for a power converter including N>=2 LLC converters configured for interleaved operation. The integrated magnetic component (802) includes a first yoke and a second yoke and for each LLC converter a winding carrying leg which comprises a primary winding (820c) and a secondary winding (821c), wherein the primary winding (820c) and the secondary winding (821c) are wound on the respective winding carrying leg. The integrated magnetic component (802) further includes one or more return legs. Herein the winding carrying legs and the one or more return legs are arranged side by side, each leg being magnetically connected to both yokes and the winding carrying legs include a transformer air gap (819) whereas the at least one return (Continued)

leg is air gap free and at least one return leg is arranged between two winding carrying legs.

The invention further relates to a power converter including a switching converter stage (811*a*, 811*b*, 811*c*), a rectifier stage (813*a*, 813*b*, 813*c*) and a resonant stage, the resonant stage including N>=2 parallel LLC converters.

16 Claims, 11 Drawing Sheets

(51) Int. Cl.
    *H01F 27/24*      (2006.01)
    *H01F 3/14*      (2006.01)
    *H02M 3/28*      (2006.01)
    *H01F 27/38*      (2006.01)
    *H02M 1/00*      (2006.01)

(52) U.S. Cl.
    CPC ......... *H01F 27/2823* (2013.01); *H01F 27/38* (2013.01); *H02M 3/285* (2013.01); *H02M 3/337* (2013.01); *H02M 2001/0058* (2013.01)

(56) References Cited

U.S. PATENT DOCUMENTS

| | | | | |
|---|---|---|---|---|
| 2009/0231887 A1* | 9/2009 | Ye | ................... | H02M 3/33569 363/21.02 |
| 2011/0316430 A1* | 12/2011 | Cohen | ............... | H02M 3/33561 315/161 |
| 2012/0262953 A1* | 10/2012 | Jungreis | ................ | H02M 3/285 363/17 |
| 2013/0250623 A1* | 9/2013 | Xu | ........................ | H02M 3/285 363/17 |
| 2013/0343091 A1* | 12/2013 | Njiende T. | .............. | H01F 30/06 363/16 |
| 2015/0180350 A1* | 6/2015 | Huang | .................. | H02J 7/0068 307/66 |
| 2015/0357921 A1* | 12/2015 | Li | ......................... | H02M 3/285 363/21.02 |
| 2016/0020016 A1* | 1/2016 | Ouyang | .................. | H02M 1/10 307/31 |
| 2016/0254756 A1* | 9/2016 | Yang | ...................... | H01F 30/12 363/21.02 |
| 2017/0011830 A1* | 1/2017 | Lu | ............................ | H01F 3/10 |
| 2017/0054378 A1* | 2/2017 | Njiende T. | .............. | H01F 30/10 |
| 2017/0214330 A1* | 7/2017 | Yang | .................... | H02M 3/285 |
| 2018/0061560 A1* | 3/2018 | Wukovits | ............... | H01F 27/24 |
| 2018/0138801 A1* | 5/2018 | Chen | .................... | H02M 7/003 |
| 2018/0191235 A1* | 7/2018 | Chen | ................. | H02M 3/33592 |
| 2018/0197673 A1* | 7/2018 | Njiende | .................. | H01F 3/10 |

OTHER PUBLICATIONS

European Search report dated Sep. 4, 2017, 10 pages.

* cited by examiner

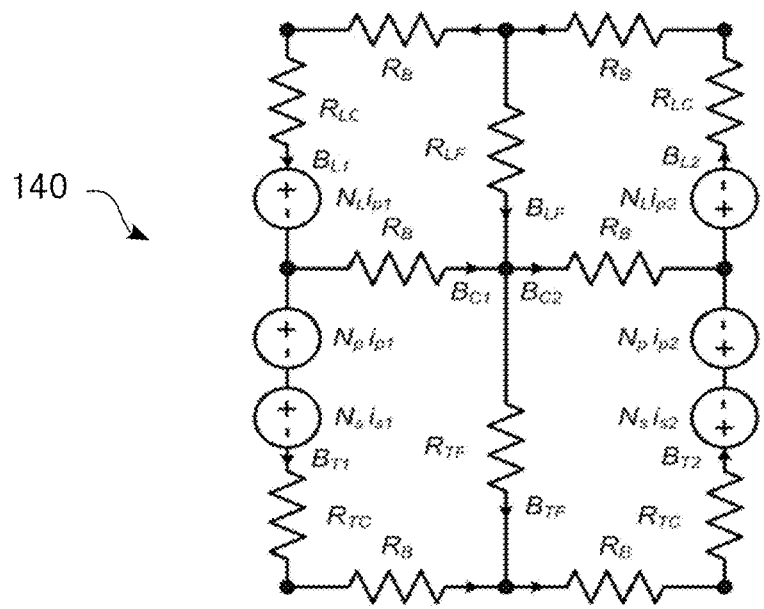
Fig. 6
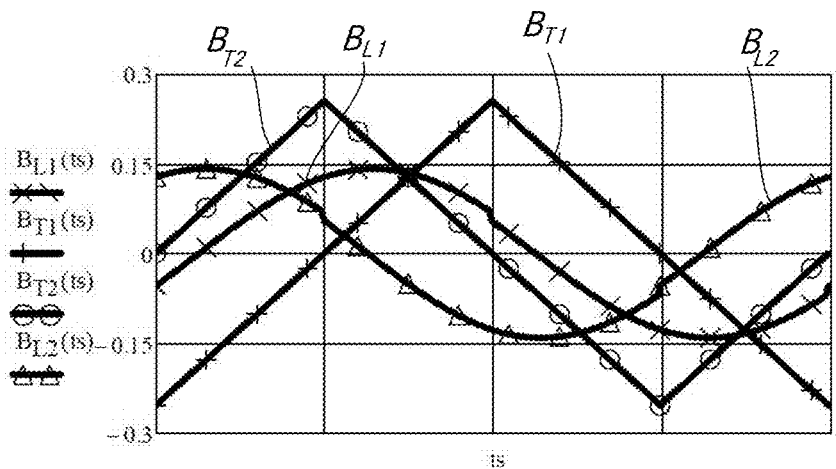
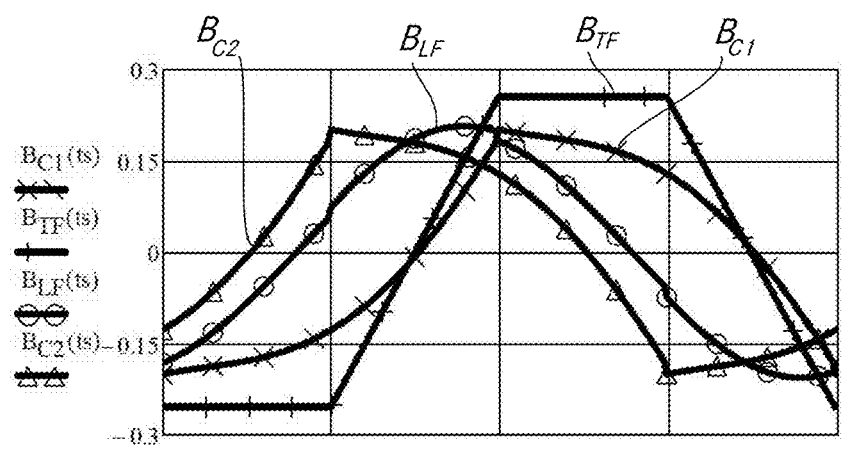
Fig. 7

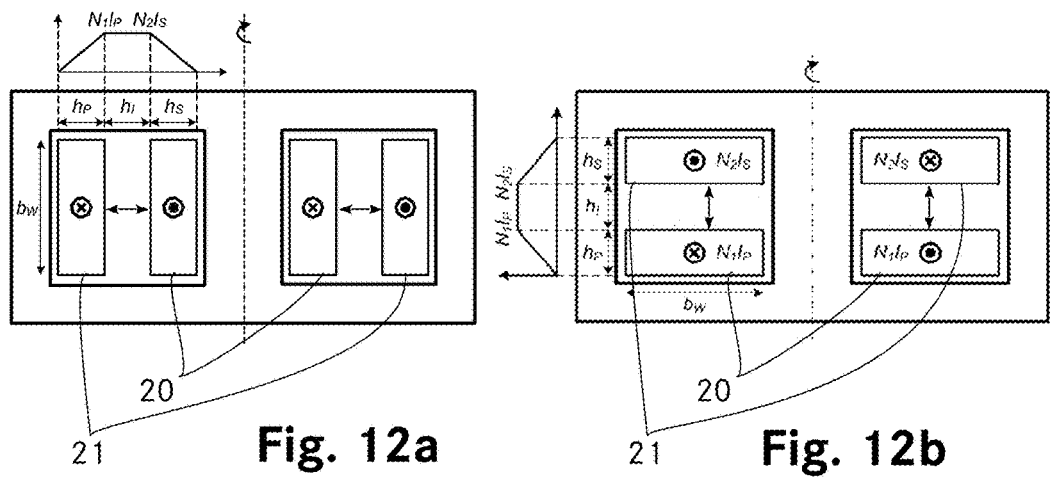
Fig. 12a  Fig. 12b
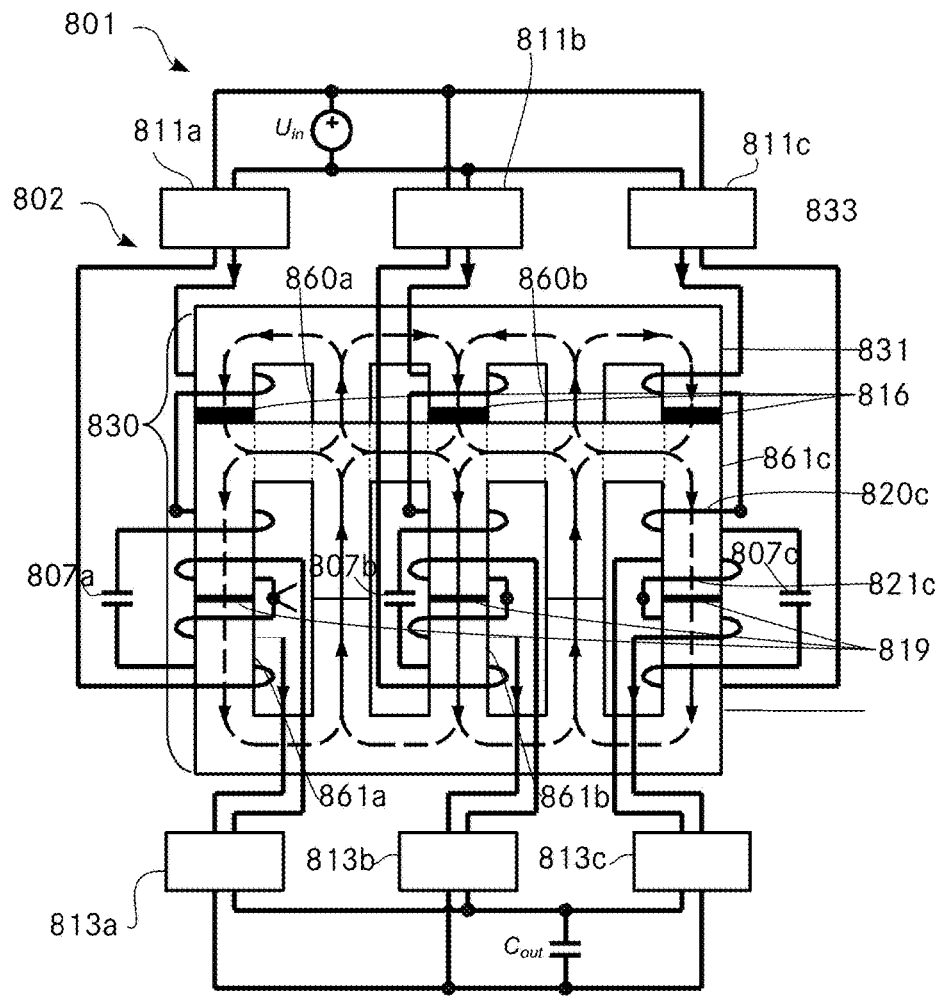
Fig. 13

INTEGRATED MAGNETIC COMPONENT AND POWER CONVERTER

TECHNICAL FIELD

The invention relates to an integrated magnetic component for a power converter including N>=2 LLC converters configured for interleaved operation. The integrated magnetic component includes a first yoke and a second yoke and for each LLC converter a winding carrying leg which comprises a primary winding and a secondary winding, wherein the primary winding and the secondary winding are wound on the respective winding carrying leg. The integrated magnetic component further includes one or more return legs. Herein the winding carrying legs and the one or more return legs are arranged side by side, each leg being magnetically connected to both yokes and the winding carrying legs include a transformer air gap whereas the at least one return leg is air gap free.

The invention further relates to a power converter including a switching converter stage, a rectifier stage and a resonant stage, the resonant stage including N>=2 parallel LLC converters.

BACKGROUND ART

Switched mode power supplies as main part of telecom and commercial systems often dictate their size and electrical performance as well as reliability and costs. As requirements for the key characteristics power density and efficiency of power converters increase, the demands of these evaluation characteristics increase for inductive components particularly. One approach of increasing the power density and the efficiency is to integrate inductive components. Transformers and inductors can be integrated into a single magnetic structure which than reduces cost, increases power density and power efficiency.

A circuit where integrated magnetics are strongly recommended is the LLC resonant converter, which is capable of yielding high efficiency and high-quality EMI while operating at high switching frequency. Resonant converters, in particular LLC resonant converters, have a growing popularity due to their high efficiency, low level of EMI emissions, and ability to achieve high power density. Further advantages are small size, light weight and high efficiency.

Moreover, the interleaving method, i.e. combining multiple single LLC resonant converters, in particular in parallel connections, is commonly used in modern power supply designs to increase the maximum output power per unit, to spread power losses, to apply phase shedding in light load operation and to decrease the size of input and output filters. Additional measures such as active current sharing control are usually necessary for interleaved converters to balance the load among the single converters.

By interleaving two LLC converters volume of bulky components can be reduced and better current distribution can be achieved. Also, due to current ripple cancellation effect, volumes of input and output filters can be reduced substantially. Arrangement with interleaved LLC converters are for instance disclosed by U.S. Pat. No. 8,564,976 and US 2014/0009985 A1. An LLC converter uses three magnetic components: a series resonant inductor, a parallel resonant inductor, a two-winding or three-winding transformer. When two LLC converters are interleaved that number of magnetic components doubles. This converter results, additionally to the number of discrete magnetic components which yield higher size and costs, in at least six windings and several interconnections which negatively impact the efficiency.

In recent years some efforts were done to integrate all three magnetic components into a single component for LLC resonant converter. US 2008/0224809 discloses an arrangement where the parallel resonant choke is integrated in the transformer by introducing an air gap in the transformer which set the magnetizing inductance. An integrated magnetic structure, with transformer and series resonant integrated, helps to increase power density as well as efficiency. Core losses are reduced by means of flux compensation in mutual core flanges and copper losses are minimized by reduction of interconnections between resonant choke and transformer. Mutual core flanges also imply increase of power density.

Despite the component integration there are still two magnetic assemblies for the two interleaved LLC converters. Core integration can be used in order to cancel the flux in mutual core segment and therefore reduce core losses and volume resulting in higher efficiency and power density.

US 2016/0254756 A1 recently disclosed an integrated magnetic component for a three phase interleaved LLC converter, comprising three series resonant inductors, three parallel inductors and three transformers. This integrated magnetic component implements automatic current equalization and achieves an effect of automatic balancing currents in all branches. However by the strong coupling of the currents design of the components becomes more complex. A structure is needed which reduces overcall core size as well as copper losses and increases the power density without negatively impacting the EMI quality. Structures suitable for two interleaved LLC converters as depicted in FIG. 1 are subject-matter of this invention.

The present interleaved power converters are either bulky or they require numerous magnetic components, or they involve a significant effort in engineering due to strong coupling between the components of the single LLC converters.

SUMMARY OF THE INVENTION

It is the object of the invention to create an integrated magnetic component for a power converter including N>=2 LLC converters configured for interleaved operation pertaining to the technical field initially mentioned, which reduces overcall core size as well as copper losses and increases the power density without negatively impacting the EMI quality, while still keeping the engineering effort low.

The solution of the invention is specified by the features of claim 1. According to the invention at least one return leg is arranged between two winding carrying legs.

The magnetic fluxes generated by the windings of said two winding carrying legs, will share the return leg as return path and thus superpose each other. Due to the interleaved operation of the LLC converter, accompanied by a phase shift between the magnetic fluxes generated by the LLC converters, the total flux in the return path is reduced. This yields to a reduction of losses in the integrated magnetic component, in particular of iron losses in the return leg. The reduction of losses also allows for reducing of the size of the integrated magnetic component. The compact assembly also yields reduction of stray inductances and amelioration of transient characteristics of the converter.

The integrated magnetic component implements the magnetic components of N LLC converters, wherein N is a natural number. A LLC converter is also known as a LLC resonant converter or as a LLC series parallel resonant. A LLC resonant converter includes a resonant circuit which uses at least the following three magnetic components: a series resonant inductor, a parallel resonant inductor and a transformer with a primary winding and secondary winding.

Yokes and the one or more return legs are magnetic core elements, comprising a magnetic core. Like the return leg a yoke defines by its magnetic core a flux path and serves for closing a magnetic flux loop in a magnetic circuit. In contrast to the winding carrying legs they do preferably not carry windings.

Also, the winding carrying legs comprise a magnetic core to define a magnetic flux path.

A magnetic core is made of a magnetically permeable material, in particular of a highly permeably material, such as for instance ferrite or iron.

The yoke magnetically connects the legs abutting the yoke. Hence, the winding carrying legs and the return legs which both are magnetically connected to the yokes are forming parallel magnetic paths between the first and the second yoke.

The air gap in the winding carrying leg is usually a concentrated gap in the magnetic flux path which is filled with air or any other material of low magnetic permeability, wherein the flux path is defined by the magnetic core of the winding carrying leg. However, an air gap also may be distributed over the winding carrying leg. This can be achieved by using a magnetic core with a lower magnetic permeability, for instance by using a magnetic core which is sintered from an iron- or an iron-alloy powder. Air gaps are applied to adjust the magnetic properties of the magnetic component and/or to store magnetic energy.

The transformer air gap is an air gap which allows configuring the magnetic characteristics of the transformer of a respective LLC converter which includes the primary winding and the secondary winding. In particular, it allows adjusting the parallel inductance of the transformer.

A return element and or a yoke is considered as air gap free if its reluctance is small in respect to the smallest reluctance of all transformer air gaps. Very small means that the magnetic reluctance is at least ten times lower than the magnetic reluctance of the smallest transformer air gap. Hence, even if the return element comprises an air gap, for instance caused by fabrication tolerances, it is considered as air gap free, if the resulting reluctance is small. Such a typical tolerance is in the range of some 10 µm.

That the legs are arranged side by side means that they are essentially arranged in parallel. Preferably also the yokes are arranged essentially in parallel to each other. It is also to be noted that yokes and the legs are preferably arranged in a rectangular angle, what simplifies the structure and the fabrication of the integrated magnetic component.

Preferably, the yokes and the legs form a grid like structure.

It is further to be noted that the legs and the yokes of the integrated magnetic circuit are preferably arranged in a plane.

The windings of the integrated magnetic component are connected in a way that fluxes through the cores will be minimized respectively that the fluxes through different parts of the cores which are caused by the different windings will be compensating each other at least to some extent. In particular the winding direction and the winding numbers will be adapted, that the fluxes through the flanges caused by the different windings will be minimized.

The integrated magnetic component may also include further windings, which also have to be connected such that the core losses are minimized.

The reluctance of the transformer air gap of a winding carrying leg mainly determines the magnetic reluctance of the winding carrying leg. The transformer air gap is typically configured such that the magnetic reluctance of the winding carrying leg is significantly higher than the magnetic reluctance of both, the yokes and the return legs. Preferably the magnetic reluctance of a winding carrying leg is at least ten times higher, even more preferable hundred times higher, than the reluctance of the yokes and the return legs together. Hence the magnetic flux of a winding carrying leg will rather take the return leg as return path, than over another winding carrying leg.

Thus the transformer windings of two winding carrying legs which are arranged on opposite sides in respect to the at least one return leg, which is arranged between the two winding carrying legs, are essentially magnetically decoupled. The LLC converters thus can be designed essentially independently from each other.

Therefore the design of the magnetic integrated component becomes more straightforward.

Moreover, by arranging the return leg between said winding carrying legs, wherein the fluxes generated by said winding carrying legs are sharing the return leg as a common return path, the total length of the magnetic paths is optimized and thus losses are reduced.

In a particular advantageous embodiment the integrated magnetic component comprises N−1 return legs where the winding carrying legs and the return legs are arranged side by side alternatingly.

By this alternating arrangement, all LLC converters are essentially magnetically decoupled from another. Hence the design of the integrated magnetic component is simplified. Moreover, this arrangement allows implementing the magnetic components for an arbitrary number of LLC converters without significantly increasing the complexity integrated magnetic component. This is on one hand due to the decoupled mode of operation of the single LLC converters, and on the other hand because further LLC converter can be added to the integrated magnetic components by alternatingly adding further return legs and winding carrying legs.

In this preferred arrangement a magnetic flux path for a magnetic flux generated by the windings of a winding carrying leg is closed via a return leg being arranged directly adjacent to the respective winding carrying leg, thus keeping the magnetic reluctance small for all winding carrying legs. So losses are further reduced, in particular for an increased number N of LLC converters.

Alternatively multiple winding carrying legs can be arranged next to each other in groups, a group being separated from another group by at least one return leg. This arrangement allows reducing the total number of legs. It also might be advantageous, if magnetic coupling of multiple winding carrying legs within a group is required, for instance in groups of three in the case of a three phase system.

Also multiple return legs can be arranged next to each other in a group. This arrangement reduces the magnetic reluctance in respect to a single return leg. This embodiment however requires more return legs and increases the size of the integrated magnetic component.

In a preferred embodiment, the number of return leg is N or N+1. In particular, if the winding carrying legs and the return legs are arranged alternatingly and the number of return legs is N+1, every winding carrying leg, including the two outer winding carrying legs, is directly adjacent to two return legs. In this embodiment the magnetic resistance for every winding carrying leg, is essentially determined by the resulting magnetic resistance of the two parallel magnetic paths which are closed via the two adjacent return legs. If in addition saturation in the core elements is avoided during operation and if all winding carrying legs and all return legs are similar and arranged equally spaced to each other, the magnetic resistance is essentially equal for all LLC converters. This yields to a further simplification of the design of the integrated magnetic component. Further, the electromagnetic interference is reduced, as the outer legs do neither carry windings nor have an air gap.

In a further preferred embodiment of the integrated magnetic component the integrated magnetic component is formed by a plurality of stacked core elements, wherein the stacked core elements are either multi-leg core elements or I-cores.

The integrated magnetic component comprises a single magnetic core structure, which includes the magnetic cores of the winding carrying legs and the return legs and the yokes. This single magnetic structure is formed by the stacked core elements, namely by the multi-leg elements and the I-cores.

In the context of this application, a plate core is a particular embodiment of an I-core.

The core elements respectively the stacked core elements are abutting or adjoining each other in the sense that specific parts of the surface of the core elements are touching each other. However, as will be described later, air gaps or any other material may be arranged between the core elements, in order to adjust the magnetic properties of the magnetic component.

A multi-leg core element comprises a flange and a number of legs being arranged on a side of said flange. The I-core comprises a single flange and no legs.

The core elements are preferably stacked in a way, that the flanges form the yokes of the integrated magnetic component respectively the single magnetic core structure and the legs of the core elements form the magnetic cores of the winding carrying legs and the return legs.

The number of legs of the integrated magnetic component, which is the sum of the winding carrying legs and the one or more return legs defines the number of legs of the multi-leg core elements.

Multi-leg core elements and I-cores are convenient for mass production. They simplify the assembly of the integrated magnetic components. If the number of legs is small, standardized core legs can be used. For cores having more than three legs, typically tools have been provided for the production. Using multi-leg cores, air gaps can be easily obtained by adapting a length of a leg in respect to the other leg respectively to the other legs of the same multi-leg-core element. This normally is achieved by grinding a leg at its free end.

In a particularly preferred embodiment, the primary winding and the secondary winding on each winding carrying leg are spatially distanced from each other, to generate a flux leakage path, defining a series inductance of a series inductor of the respective LLC converter.

By this arrangement, the core structure of the integrated magnetic component is extremely simplified. The integrated magnetic component requires only a first and second yoke. In addition no extra choke winding is required. Thus the number of components and therefore the costs are reduced to a minimum.

In a further preferred embodiment, the integrated magnetic component comprises a third yoke which is arranged between the first and the second yoke. The third yoke divides each winding carrying leg in a transformer section and a first choke section. This first choke section of each winding carrying leg comprises a first choke air gap and a first choke winding for defining a first series inductance of a first series inductor of a LLC converter and the transformer section comprises the transformer air gap and the primary and the secondary winding.

The third yoke further divides also the return legs in a first and a second section.

In this embodiment the transformer windings, namely the primary windings and the secondary windings, share with the choke windings being arranged on the same winding carrying leg, a section of the third yoke as a common magnetic flux path. The fluxes of the transformer windings and the choke winding are partially compensating each other, thus reducing the total magnetic flux and the iron losses.

Introduction of a transformer air gap and a choke air gap in every winding carrying leg permits separate design of each inductance.

In an alternative embodiment at least one or more separate magnetic cores are provided, the one or more separate magnetic cores include a first choke winding and a first choke air gap for each LLC converter, or defining a first series inductance of a first series inductor of a LLC converter.

In a further alternative embodiment, a fourth yoke is provided in parallel to the third yoke, to avoid that the transformer windings and the first choke winding share a common flux path section.

In another alternative embodiment, the integrated magnetic component comprises a third yoke which is arranged between the first and the second yoke. However the choke winding and/or the choke air gap of an LLC converter are arranged in a section of the yoke adjacent to the choke section of the respective winding carrying leg, said section of the yoke being arranged between the winding carrying leg and the respective return leg which is adjacent to the winding carrying leg.

In a particularly preferred embodiment, the plurality of stacked core elements comprises three multi-leg core elements or two multi-leg core elements and one I-core.

The core elements are preferably stacked in a way, that the flanges form the yokes of the integrated magnetic component respectively the single magnetic core structure and the legs of the core elements form the magnetic cores of the winding carrying legs and the return legs.

This embodiment reduces the number of required components to a minimum.

It is particularly advantageous if the integrated magnetic component comprises a fourth yoke which is arranged between the second yoke and the third yoke and which is dividing each transformer section in a second choke section and a sub-transformer section. Herein the second choke section of each winding carrying leg comprises a second choke air gap and a second choke winding for defining a second series inductance of a second series inductor of a LLC converter and the sub-transformer section comprises the transformer air gap and the primary and the secondary winding.

This arrangement allows splitting of the series inductance of the LLC converter.

By distributing the choke windings over a first choke winding and a second choke winding and simultaneously distributing the choke air gap over a first and a second choke air gap the losses are reduced. Distributing the stored magnetic energy over two air gaps reduces the total air gap fringing compared to a single air gap capable of storing the same magnetic energy. In addition a better symmetry at primary side of the transformer is achieved.

A further advantage of this embodiment is that integrated magnetic circuit will have an improved transient response.

In a further preferred embodiment of the invention, the plurality of stacked core elements comprises four multi-leg core elements or three multi-leg core elements and one I-core.

It is particularly advantageous if the first choke winding of an LLC converter and the primary winding of the same LLC converter are realized with a single wire, the winding of said first choke winding and the winding of said primary winding being connected in series by said single wire.

It is particularly preferred if a second choke winding is also wound by the single winding and the winding of said second choke winding also being connected in series with the winding of the first choke winding and the winding of the primary winding.

A continuous connection, established by the single wire respectively by a single connector, between the choke windings and the primary winding reduces the total number of soldered terminations and therefore reduces copper losses. Additional lead-outs between the windings can be avoided. In addition it simplifies the production process and therefore the costs of the integrated magnetic component.

Also the production process is simplified.

In some embodiments it might be advantageous to first mount the transformer and/or the choke windings on the legs of the cores before assembling the core elements. In such a case it might be advantageous that the windings are only connected after the assembling of the core elements. The connection between the choke windings and one of the first or the second transformer might be realized by providing lead-outs of the respective windings and connecting them to a circuit board, for instance by soldering.

It is particularly advantageous if the first choke winding of an LLC converter is wound on a winding carrying leg different from the winding carrying leg, where the primary winding and the secondary winding of the same LLC converter are wound, the winding of said first choke winding and the winding of said primary winding being connected in series.

By this arrangement of the windings less core losses can be achieved in comparison to an arrangement where the first choke winding and the primary winding of an LLC converter are arranged on the same winding carrying leg.

In a further preferred embodiment of the invention, N=2.

Hence the converter arrangement comprises two LLC converters. This yields to a very compact design of the integrated magnetic component.

It is particularly preferred that the multi-leg core elements are E-cores.

In the context of this application E-cores should also include other core similar cores elements having three legs. A non-exhaustive list includes three-leg cores such as E-, ER-, EFD-, ETD-, PQ-, PM-, or RM-cores. The different E-shaped core types differ in their geometry. E-cores have the simplest geometry, their flanges and their legs having a rectangular cross section. ER-cores are similar, but their inner legs comprise a round cross-section. ETD-cores also have round inner legs, but their outer legs have concave surfaces which are oriented towards the inner leg. EFD- (Economical Flat Design) cores have a flat design, their legs having an essentially rectangular cross section and their inner leg has a particular flat shape. PQ-, RM- and PM-cores are so called pot core type cores. They comprise a strongly optimized geometry with round inner legs and flanges which are formed to at least partially surround and shield the windings.

In further preferred embodiment the magnetic component N=3, the LLC converter implementing the magnetic components of three LLC converters.

Advantageously the transformer air gap of the winding carrying leg is arranged between a leg and a flange of a core element or between two legs of core elements which are abutting each other with their legs.

Preferable also the choke air gaps are arranged between a leg and a flange of a core element or between two legs of core elements which are abutting each other with their legs.

That means that the air gaps are arranged at connection points between the stacked core elements. The advantage of this embodiment is, that the air gap can either be ground in the legs or be considered by using pre-fabricated core elements, where the length of the legs have been adjusted. The air gaps are preferably ground before assembling the respective core elements. The air gaps may be filled with any suitable material or left empty. By filling the air gaps with a non-permeably material the mechanical stability of the integrated magnetic circuit can be increased.

The air gaps can also be integrated in between a leg of a core or in between a flange and a leg of a core. Also more than one air gap can be integrated in a leg of a core. Thus the air gap fringing can be reduced.

In combination with concentrated air gaps or instead of concentrated air gaps distributed air gaps also may be applied by using powder materials for the core elements or parts of the core elements, in particular for the legs.

In a further preferred embodiment the primary windings are split in a first primary winding part and a second primary winding part.

This arrangement allows inserting a series resonant capacitor of the LLC circuit between the primary parts. Also other elements may be connected between the transformer winding parts, as for instance a resistive element for damping purposes or a shunt resistor for measuring an input current.

In an advantageous embodiment of the invention, the integrated magnetic component elements is mirror symmetrical in respect to an axis parallel to the legs of the core elements.

A symmetrical arrangement of the core elements involves a symmetrical distribution of the magnetic flux in the circuit and therefore also lowers losses. In particular the compensation of fluxes in the return legs can be optimized. A symmetrical arrangement also lowers production costs and facilitates assembly.

In another advantageous embodiment of the integrated magnetic component according to the invention, the integrated magnetic component is mirror symmetrical in respect to an axis parallel to a yoke.

This embodiment has, in particular, the advantage that both choke inductances are symmetrical what significantly increases the performance of the integrated magnetic component.

The invention further relates to a power converter including a switching converter stage, a rectifier stage and a resonant stage, wherein the resonant stage includes $N>=2$ parallel LLC converters. A transformer, a parallel inductor and a series inductor of the LLC converters are formed by an integrated magnetic component according to the invention.

It is preferred, that the converter stage comprises a single switching converter per LLC converter, providing a square voltage to the resonant circuit of the LLC converter. The single switching converter is preferably an H-bridge converter comprising four switches.

The integrated magnetic component is generally adapted for use in DC-DC, AC-DC and DC-AC power converters with N>=2 LLC converters. It is particularly adapted for use in DC-DC power converters with N>=2 LLC converters. In case of an AC-input, the converter stage may include a rectifying circuit, such as an AC/DC power factor correction (PFC) converter.

It is further preferred, that the rectifier stage comprises a single rectifier per LLC converter.

The rectifier includes advantageously synchronous rectifiers. Synchronous rectifiers are active controlled switches. Those switches can for instance comprise metal-oxide-semiconductor field-effect transistors (MOSFETs) or bipolar junction transistors (BJT). Synchronous rectifiers allow for improving the efficiency of rectification. As they have a low on-resistance, they can significantly reduce ohmic losses compared to ordinary semiconductor diodes, in particular, when high currents are present.

In a particular preferred embodiment of the invention, the power converter comprises two or three LLC converters.

Other advantageous embodiments and combinations of features come out from the detailed description below and the totality of the claims.

BRIEF DESCRIPTION OF THE DRAWINGS

The drawings used to explain the embodiments show:

FIG. 5b shows the magnetic core structure of the embodiment shown in FIG. 5a;

FIG. 6 shows a reluctance model of the integrated magnetic component according to the first embodiment shown in FIGS. 5a and 5b.

FIG. 7 illustrates the run of the flux densities in the integrated magnetic component according to FIGS. 5a and 5b, when the two LLC interleaved converters are operated with 90° phase shift, based on the reluctance model according to FIG. 6;

FIG. 10b shows the magnetic core structure of the embodiment shown in FIG. 10a;

FIGS. 12a, 12b show a simplified model of transformer, to illustrate the calculation of, the leakage inductance.

FIG. 13 depicts a power converter with another embodiment of the inventive integrated magnetic component, which integrates the magnetic components of three LLC converters;

In the figures, the same components are given the same reference symbols. Similar elements of different embodiments are denoted by similar reference numerals differing by the hundreds digit if they are depicted in different drawings.

Preferred Embodiments

Figure 1:
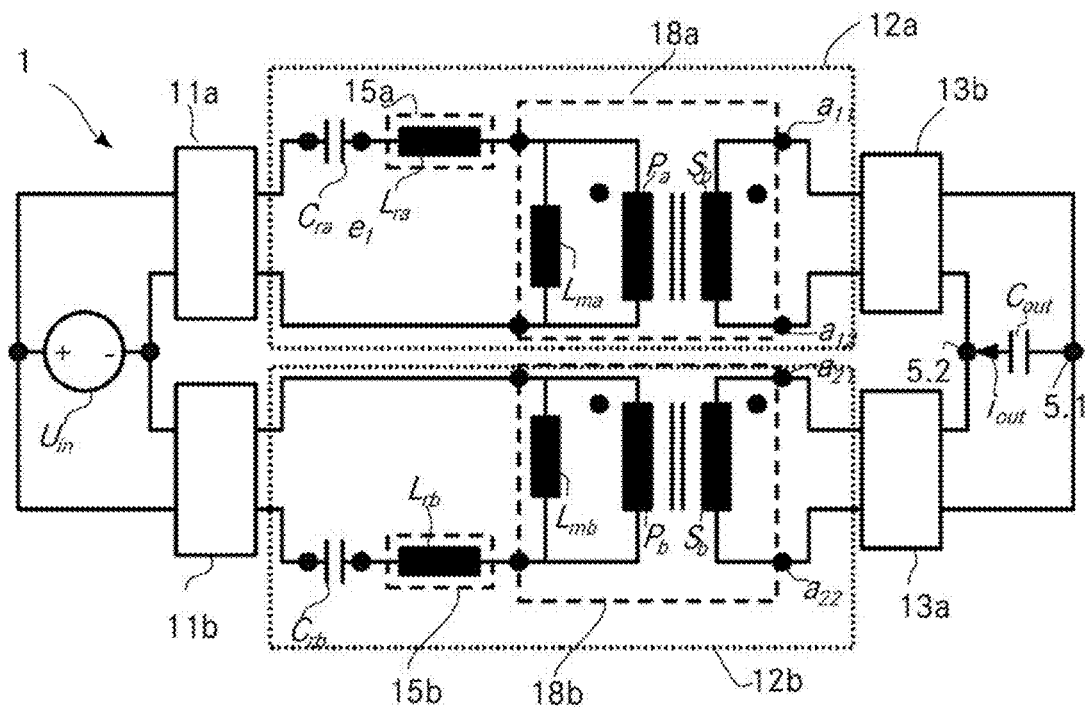
FIG. 1 shows a prior-art circuit diagram of a DC-DC power converter 1 including two interleaved LLC resonant converters.

FIG. 1 shows a prior-art circuit diagram of a DC-DC power converter 1 including two interleaved LLC resonant converters, which are arranged in parallel. Each LLC resonant converter comprises a switching converter 11a, 11b, a resonant circuit 12a, 12b and an output rectifier 13a, 13b. The switching converters 11a, 11b of both resonant circuits 12a, 12b are connected with their inputs in parallel to a common DC input voltage $U_{in}$, and with their outputs to the inputs of the respective resonant circuit 12a, 12b. In case an AC voltage is provided, each switching converter 11a, 11b may include a rectifier, such as a PFC converter, redressing the AC-voltage to an intermediate DC-voltage. Each of the two switching converters 11a, 11b preferably includes two or four switches to generate a square wave output voltage for being provided to the inputs of its respective resonant circuit 12a, 12b. A LLC resonant circuit 12a, 12b uses three magnetic components, namely a series resonant inductor $L_{ra}$, $L_{rb}$, a parallel resonant inductor $L_{ma}$, $L_{mb}$ and a transformer with a primary winding $P_a$, $P_b$ and secondary winding $S_a$, $S_b$. The LLC resonant converter is also known as LLC series parallel resonant converters or LLC converter.

The parallel resonant inductor $L_{ma}$, $L_{mb}$ and primary winding $P_a$, $P_b$ of a LLC resonant converter are arranged in parallel, both being connected in series to the series resonant inductor $L_{ra}$, $L_{rb}$. The resonant circuit 12a, 12b further comprises a series resonant capacitor $C_{ra}$, $C_{rb}$, which is connected in series to the series resonant inductor $L_{ra}$, $L_{rb}$.

In the following we may also omit the word "resonant" in the terms "parallel resonant inductor", "series resonant inductor", "series resonant capacitor" and "LLC resonant converter". In FIG. 1, the transformers are two winding transformers, each having a single secondary winding $S_a$, $S_b$ with two ends forming the output of the respective resonant circuit 12a, 12b. They are connected to the rectifier stage 13a, 13b of the respective LLC resonant converter, redressing the AC-voltage at the output of the resonant 12a, 12b to a DC voltage. The outputs of the output rectifiers 13a, 13b are connected in parallel to an output filter capacitor $C_{out}$, which is arranged in parallel to a first output 5.1 and a second output 5.2 of the power converter 1. Depending on the used rectifier circuit type, also three winding transformers could be used, having three output connections, allowing for instance the use of a centre tapped rectifier. The magnetic components of the power converter with two interleaved LLC converter as shown in FIG. 1 are usually implemented by means of four discrete magnetic components: a first choke core 15a, second choke core 15b, and a first transformer core 18a and the second transformer core 18b. Those components are indicated by dashed lines in FIG. 1.

Figure 2:
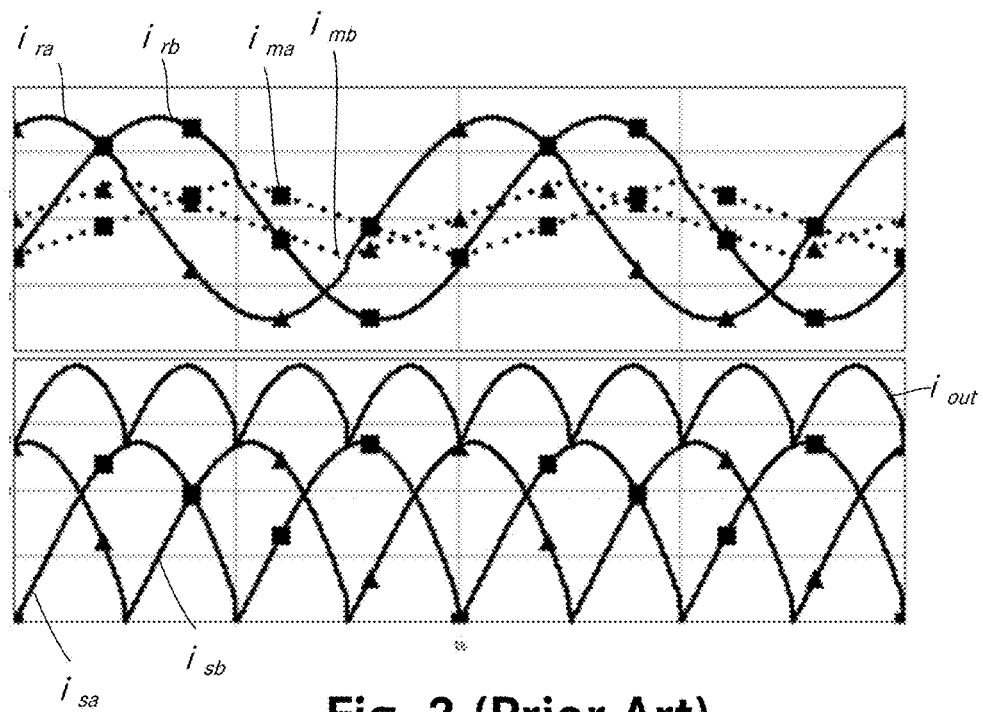
FIG. 2 illustrates the run currents of the two LLC resonant converters according to FIG. 1 when operating in interleaved manner with 90° phase shift.

FIG. 2 illustrates the run currents of the two LLC resonant converters according to FIG. 1 when operating in interleaved manner with 90° phase shift. The upper plot depicts the series inductor currents $i_{ra}$ and $i_{rb}$, which are the currents through the series inductors $L_{sa}$, and $L_{sb}$ and the parallel inductor currents $i_{ma}$ and $i_{mb}$, which are the currents through the parallel inductors $L_{ma}$, $L_{mb}$. It is seen that the series inductor currents $i_{ra}$ and $i_{rb}$ are essentially sinusoidal and have a phase shift of 90° in respect to each other. The parallel inductor currents have essentially a triangular shape and are also phase shifted by 90° to each other.

The lower plot of FIG. 2 shows the run of the secondary winding currents $i_{sa}$ and $i_{sb}$, which are the currents through the secondary windings of the transformers after redressing, and the output current $i_{out}$ (see also FIG. 1), which is equal to the sum of both secondary winding currents $i_{sa}$ and $i_{sb}$. It is seen that the secondary winding currents $i_{sa}$ and $i_{sb}$ are phase shifted by 90° and that the current ripple of the output current $i_{out}$ is reduced in respect to the single secondary winding currents $i_{sa}$ and $i_{sb}$.

Figure 3:
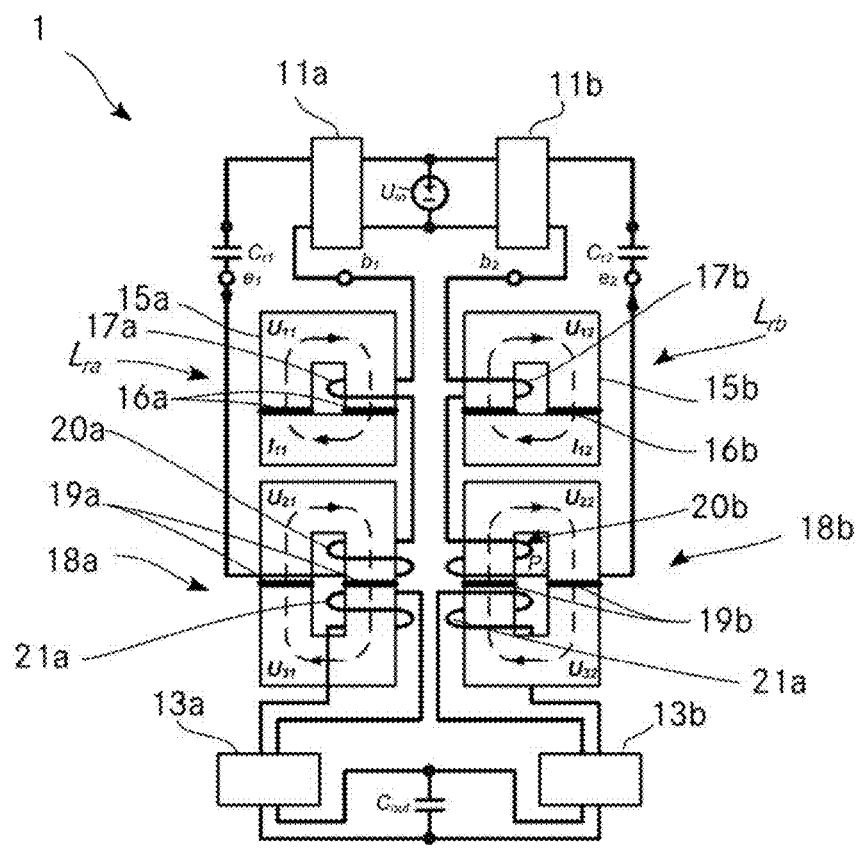
FIG. 3 illustrates a prior art configuration of a power converter using discrete magnetic components.

FIG. 3 illustrates a prior art configuration of the power converter shown in FIG. 1 using discrete magnetic components. It shows the two separate magnetic cores of the first LLC converter, namely the choke core 15a and the transformer core 18a and of the second LLC converter, namely the choke core 15b and the transformer core 18b.

The choke cores 15a and 15b implement the series inductor $L_{ra}$, and $L_{rb}$, of the respective LLC converter, and the transformer cores 18a and 18b the transformer and the parallel inductance $L_{ma}$, $L_{mb}$ of the respective LLC converter.

Both LLC converters have the same structure and use essentially the same passive elements, as far as fabrication tolerances allow so, and therefore the magnetic components of the first and the second converter are essentially identical. This is required in order optimize the performance of the power converter 1 with the two interleaved resonant circuits.

The structure of the first (second) LLC converter is as follows: The choke core of the first (second) LLC converter 15a (15b) comprises a first U-core $U_{11}$ ($U_{12}$) and a plate-core $I_{11}$ ($I_{12}$), which are arranged to form an O-like shape. Choke air gaps 16a (16b) are arranged between the first U-core $U_{11}$ ($U_{12}$) and the plate-core $I_{11}$ ($I_{12}$).

The transformer core of the first (second) LLC converter 18a (18b) comprises a second U-core $U_{21}$, ($U_{22}$) and a third U-core $U_{31}$ ($U_{32}$) which are abutting each other with their legs, forming the O-shape of the transformer core. Transformer air gaps 19a (19b) are arranged between the cores.

The primary windings 20a (20b) and the secondary windings 21a (21b) of the transformer of the first (second) LLC converter are wound around one of the abutting pair of legs of the second U-core $U_{21}$ ($U_{22}$) and the third U-core $U_{31}$ ($U_{32}$). Herein the primary winding 20a (20b) and the first choke 17a (17b) are connected in series.

Figure 4:
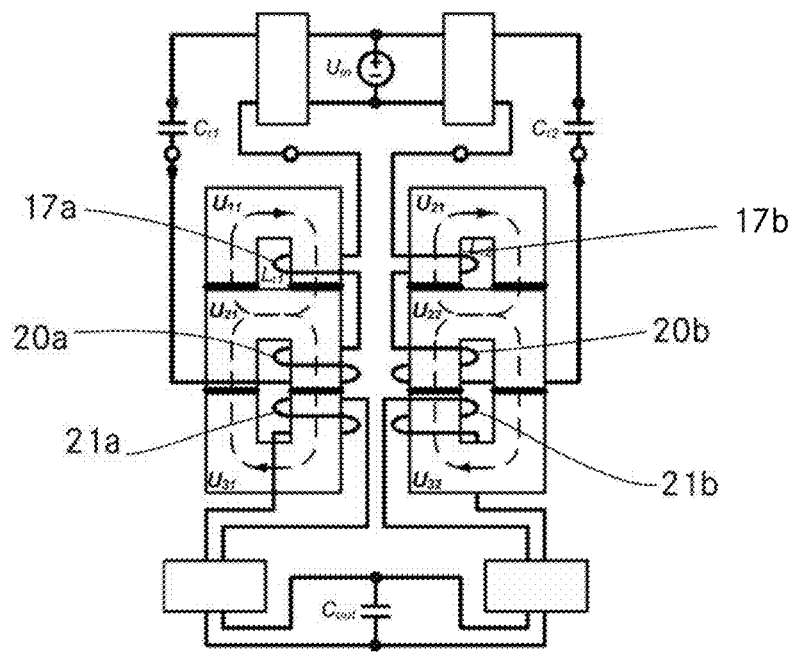
FIG. 4 illustrates another configuration of a prior art power converter, using a single magnetic core structure for each LLC converter.

FIG. 4 shows another configuration of the magnetic components belonging to the prior art, for implementing the power converter according to FIG. 1. In this configuration, each LLC converter comprises a single magnetic core structure, each including three U-core elements, namely $U_{11}$, $U_{21}$ and $U_{31}$ for the first LLC converter and $U_{12}$, $U_{22}$ and $U_{32}$ for the second LLC converter, arranged to form an 8-shaped core. The magnetic core structure of the first (second) LLC converter is as follows: The first choke winding 17a (17b) is arranged on a leg of the first U-core element $U_{11}$ ($U_{12}$), which abuts a flange of the second U-core element $U_{21}$ ($U_{22}$) whereas the transformer windings are arranged on a pair of the abutting legs of the second U-core element $U_{21}$ ($U_{22}$) and the third U-core element $U_{31}$ ($U_{32}$). Thus the choke windings are arranged in a closed magnetic flux path being formed by the first U-core element $U_{11}$ ($U_{12}$), and a flange of the second U-core element $U_{21}$ ($U_{22}$), and the transformer windings in a closed flux path defined by the second U-core element $U_{21}$ ($U_{22}$), and the third U-core element $U_{31}$ ($U_{32}$). The flux paths are sharing the flange of the second U-core element $U_{21}$ ($U_{22}$).

Figure 5A:
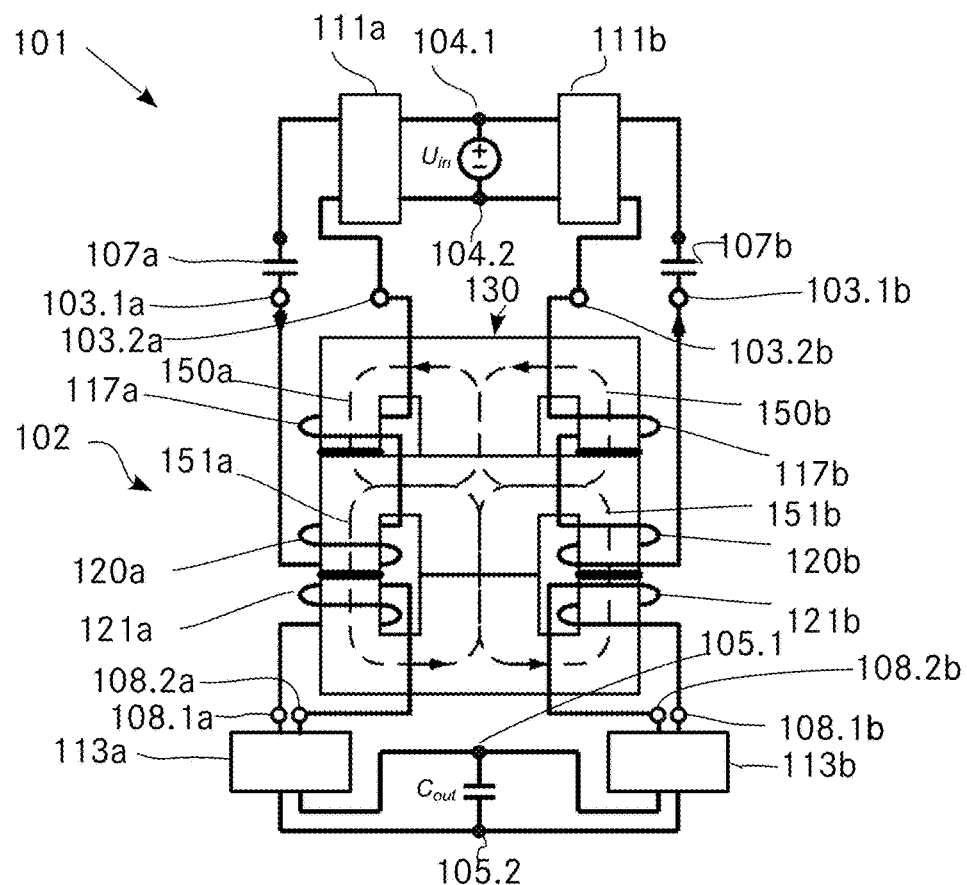
FIG. 5a shows a first embodiment of the integrated magnetic component according to the invention which includes two interleaved LLC resonant converters.

FIG. 5a shows a first embodiment of the power converter 101 including the integrated magnetic component 102 according to the invention. The power converter 101 includes similarly to the power converter shown in FIGS. 3 and 4, two interleaved LLC resonant converters and can be modelled by means of the same equivalent circuit diagram shown in FIG. 1 as the prior art converters according to FIGS. 3 and 4. The power converter according to FIG. 5a however differs from prior art converters by its integrated magnetic component 102 which implements the magnetic components of the two interleaved magnetic LLC converters in a single magnetic core 130.

The power converter 101 includes besides the integrated magnetic component 102 a DC voltage input with a first and a second input terminal 104.1 and 104.2, for being connected to a DC voltage source Uin, and an output comprising a first and a second output terminal 105.1 and 105.2 for providing a DC output voltage.

The power converter further comprises a first LLC resonant converter with a first switching converter 111a, a first output rectifier 113a and a first resonant capacitor 107a, and a second LLC resonant converter with a second switching converter 111b, a second output rectifier 113b and a second resonant capacitor 107b. The rectifiers 113a and 113b are preferably synchronous rectifiers.

The switching converters 111a, 111b of both LLC resonant circuits are connected with their inputs in parallel to the terminals 104.1 and 104.2 of the common DC input voltage $U_{in}$, and with their outputs to the inputs of the respective LLC resonant circuit. In case an AC voltage is provided, each switching converter 111a, 111b may include a rectifier circuit.

The passive magnetic components of the first LLC converter, namely the first series (resonant) inductor $L_{ra}$, the first parallel (resonant) inductor $L_{ma}$ and the transformer with the first primary winding $P_a$ and the first secondary winding $S_a$ are implemented by means of the integrated magnetic component 102. Those passive magnetic components form together with the first series capacitor 107a the first resonant circuit of the first LLC converter.

Likewise the power converter comprises for the second LLC resonant converter a second switching converter 111b, a second output rectifier 113b and a second resonant capacitor 107b. Those passive magnetic components of the second LLC converter, namely the second series (resonant) inductor $L_{rb}$, the second parallel (resonant) inductor $L_{mb}$ and the transformer with the second primary winding $P_b$ and the second secondary winding $S_b$ are implemented by means of the same integrated magnetic component 102 as the magnetic components of the first LLC converter. Those passive magnetic components form together with the second series capacitor 107b the resonant circuit of the second LLC converter.

The integrated magnetic component 102 comprises four inputs, namely a first input 103.1a and a second input 103.2b for the first LLC resonant converter and a third input 103.1b and a fourth input 103.2b for the second LLC resonant converter. It further comprises four outputs, namely a first output 108.1a and a second output 108.2a for the first LLC resonant converter and third output 108.1b and a fourth output 108.2b for the second LLC resonant converter.

Figure 5B:
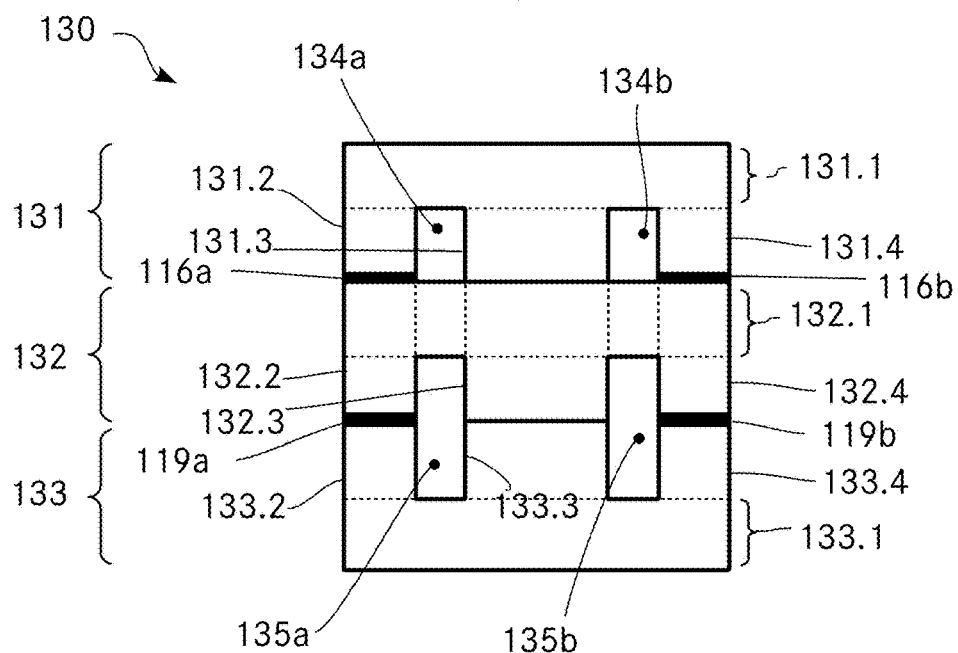

The integrated magnetic component 102 includes a single magnetic core structure 130 which is schematically depicted for better representation isolated from the other components in FIG. 5b.

The magnetic core structure 130 comprises three stacked three-leg cores respectively E-cores, namely a first E-core 131, a second E-core 132 and a third E-core 133. Each of the cores comprises a flange and three legs, namely an inner leg and two outer legs, the legs being arranged in parallel on a side of the flange. So the first E-core 131 comprises a flange 131.1, which magnetically connects the first outer leg 131.2, the inner leg 131.3 and the second outer leg 131.4 of the first E-core 131.

The second E-core 132 has a similar shape as the first E-core 131, though the length of its legs typically differs in respect to the length of the legs of the first E-core. It also comprises a flange 132.1, which magnetically connects the first outer leg 132.2, the inner leg 132.3 and the second outer legs 132.4 of the second E-core 132.

The third E-core 133 is similar to the second E-core 132. It also comprises a flange 133.1, which on its turn magnetically connects the first outer leg 133.2, the inner leg 133.3 and the second outer leg 133.4 of the second E-core 133.

The first E-core 131 is arranged on the second E-core 132 in a way that its legs about the flange 132.1 of the second E-core 132, defining a first choke winding window 134a and a second choke winding window 134b. A first choke air gap 116a is arranged between the first outer leg 131.2 of the first E-core and the flange 132.1 of the second E-core 132 and a second choke air gap 116b is arranged between the second outer leg 131.4 of the first E-core 131 and the flange 132.1 of the second E-core 132. No air gap is provided between the inner leg 131.3 of the first E-core 131 and the flange of the second E-core 132.

The second E-core 132 and the third E-core 133 are arranged to form an eight-like shape wherein their first outer legs 132.2, 133.2, their inner legs 132.3, 133.3 and their second outer legs 132.4, 133.4 are abutting each other, defining a first transformer winding window 135a and a second transformer winding window 135b.

A first transformer air gap 119a is arranged between the first outer legs 132.2 and 133.2 of the second E-core 132 and the third E-core 133 and a second transformer air gap 119b is arranged between the second outer legs 132.4 and 133.4 of the second E-core 132 and the third E-core 133. No air-gap is provided between the inner legs 132.3 and 133.3 of the second E-core 132 and the third E-core 133. The air gaps can be achieved by grinding the respective outer legs. In order to increase the mechanical stability they may be filled with a material of low magnetic permeability.

The first outer leg 131.2 of the first E-core 131, the first choke air-gap 116a, the second E-core 131 and 132, the first outer leg 132.2 of the second E-core 132, the first transformer air gap 119a and the first outer leg 133.2 of the third E-core 133 form a first magnetic path between the first and the second yoke of the magnetic core structure, defining a first winding carrying leg.

Similarly, the second outer leg 131.4 of the first E-core 131, the second choke air-gap 116b, the second outer leg 132.4 of the second E-core 132, the second transformer air-gap 119b and the second outer leg 133.4 of the third E-core 133 form a second magnetic path between the first and the second yoke of the magnetic core structure, defining a second winding carrying leg.

Further, the inner leg 131.3 of the first E-core 131, the inner leg 132.3 of the second E-core 132 and the inner leg 133.4 of the third E-core 133 form a third magnetic path between the first and the second yoke of the magnetic core structure 130, said path defining a return leg.

The flange 131.1 of the first E-core element forms the first yoke of the integrated magnetic component. Likewise the flange 133.1 of the third E-core 133 forms a second yoke of the integrated magnetic component 102 and the flange 132.1 of the second E-core forms the third yoke of the magnetic core structure 130 dividing the winding carrying legs in a transformer section and a choke section and also dividing the return leg in a transformer section and a choke section.

The windings of the integrated magnetic core structure 130 are all arranged on the winding current legs respectively on the outer legs. As the integrated magnetic component is essentially symmetrical in respect to an axis through the inner legs, and the description of the windings on the first inner legs and the second outer legs, is similar: A first (second) choke winding 117a (117b) (FIG. 5a, not shown in FIG. 5b) is arranged on the section of the first (second) winding carrying leg, which is situated between the flange 131.1 of the first E-core respectively the first yoke and the flange 132.1 of the second E-core, respectively the third yoke. The section will be designated as first (second) choke section. The first (second) choke winding window 134a (134b) receives turns of the first (second) choke winding 117a (117b).

A first (second) primary winding 120a (120b) and a first (second) secondary winding 121a (121b) are arranged on a section of the first (second) winding carrying leg, which is situated between the flange 132.1 of the second E-core 132 respectively the third yoke and between the flange of the third E-core 133 respectively the second yoke. The section will be designated as first (second) transformer section. The first (second) transformer winding window 135a (135b) receives turns of the first (second) primary winding 120a (120b) and the first (second) secondary winding 121a (121b).

The first (second) primary transformer winding 120a (120b) is connected with one end to the first (third) input 103.1a (103.1b) of the integrated magnetic component 102 and with the other end to a first end of the first (second) choke winding 117a (117b). The other end of the first (second) choke winding 117a (117b) is connected to the second (fourth) input 103.2a (103.2b) of the integrated magnetic component.

The first (second) secondary winding 121a (121b) is connected with one end to the first (third) output 108.1a (108.1b) and with the other end to the second (fourth) output 108.2a (108.2b) of the integrated magnetic component 102.

The first (second) resonant capacitor 107a (107b) is connected between a first output of the first (second) switching converter 111a (111b) and the first (third) input 103.1a (103.1b) of the integrated magnetic component 102. The second (fourth) input is connected to a second output of the first (second) switching converter 111a (111b).

The magnetic core structure defines four independent closed magnetic flux paths, a first choke flux paths 150a, a second choke flux path 150b, a first transformer flux path 151a and a second transformer flux path 151b. The first choke flux path 150a and the second choke flux path 150b share a common section of the return leg, namely the choke section of the return leg which is arranged between the first and the third yoke, which is formed by the inner leg 131.3 of the first E-core 131. Also the first transformer flux path 151a and the second transformer flux 151b path share a common section of said return leg, namely the transformer section, which is formed by the inner legs 132.3 and 133.3 of the second and the third E-core 132 and 133. Furthermore, the first choke flux path 150a and the first transformer flux path 151a and the second choke flux path 150b and the second choke flux path 151b share a common section of the third yoke.

FIG. 6 shows a reluctance model 140 of the integrated magnetic component 102 according to the first embodiment of the invention (FIGS. 5a and 5b). The reluctance of the three flanges 131.1, 132.2 and 133.3 of the E-cores 131, 132 and 133 are considered to be identical and each flange being represented by a flange reluctance RB. The reluctance of the two transformer sections of the winding carrying legs, each including the reluctance of the respective transformer air gap 119a/119b and of the respective outer legs 132.2, 133.2, 132.4 and 133.4 of the second and third core 132 and 133, and are represented by the transformer section reluctance $R_{TC}$.

$R_{LC}$ represents the reluctance of the choke sections of the winding carrying legs, each including the reluctance of the respective outer leg 131.2 and 131.4 of the first E-core 131 and of the respective choke air gap 116a/116b. The reluctance of the two inner legs 132.3 and 133.3 of the second and third E-core 132 and 133 is lumped in the transformer inner leg reluctance $R_{TF}$ whereas the reluctance of the inner leg of the first E-core 131 is represented by the choke inner leg reluctance $R_{LF}$.

The current through the first choke windings 117a and first primary transformer winding 120a is considered to be the same and represented by the first primary current $i_{p1}$. Likewise, the current through the second choke windings 117b and the second primary transformer winding 120b is considered to be the same and represented by the current $i_{p2}$.

The first secondary current $i_{s1}$ represents the current through the first secondary winding 121a and the second secondary current $i_{s2}$ the current through the second secondary windings 121b. Windings turn numbers are: for the first and the second choke winding $N_L$, for the first and second primary winding $N_P$, and $N_S$ for the first and the second transformer secondary winding.

FIG. 7 illustrates the run of the flux densities in the integrated magnetic component according to FIGS. 5a and 5b for one operation cycle, when the two LLC interleaved converters are operated with 90° phase shift, based on the reluctance model according to FIG. 6.

FIG. 7, upper plot, illustrates the runs of the choke flux densities $B_{L1}$ and $B_{L2}$ through the first and second choke section and of the transformer flux densities $B_{T1}$ and $B_{T2}$ through the transformer sections of the first and the second winding carrying leg. The choke flux densities $B_{L1}$ and $B_{L2}$ are essentially sinusoidal while the curve of the transformer flux densities $B_{T1}$ and $B_{T2}$ are essentially triangular. Those runs correspond to the runs depicted in the upper plot of FIG. 2 for the prior art power converter.

FIG. 7, lower plot, shows the flux densities in the mutually shared paths of the integrated magnetic component, modelled by the reluctance model according to FIG. 6a. The run of the flux density $B_{TF}$ through the inner legs adjacent to the transformer winding window respectively through the reluctance designated as $R_{TF}$ has a trapezoidal shape and a magnitude which is essentially the same as magnitude of each of the single transformer flux densities $B_{T1}$ and $B_{T2}$, though the transformer fluxes are superimposed in the mutual flange.

The run of the flux density $B_{LF}$ through the inner legs adjacent to the choke winding windows respectively through the reluctance designated as $R_{LF}$ has an essentially sinosoidale shape. Also its magnitude is only slightly higher than the magnitude of the choke flux densities $B_{L1}$ and $B_{L2}$.

Also the magnitudes of the mutually shared flux densities $B_{C1}$ and $B_{C2}$ in the flange of the second E-core which is mutually shared by the transformer flux $B_{T1}/B_{T2}$ and the choke flux $B_{L1}/B_{L2}$ of the respective LLC resonant converter is significantly lower than the sum of the magnitude of the flux densities.

As a consequence the size of the commonly used core section can be reduced.

Figure 8A:
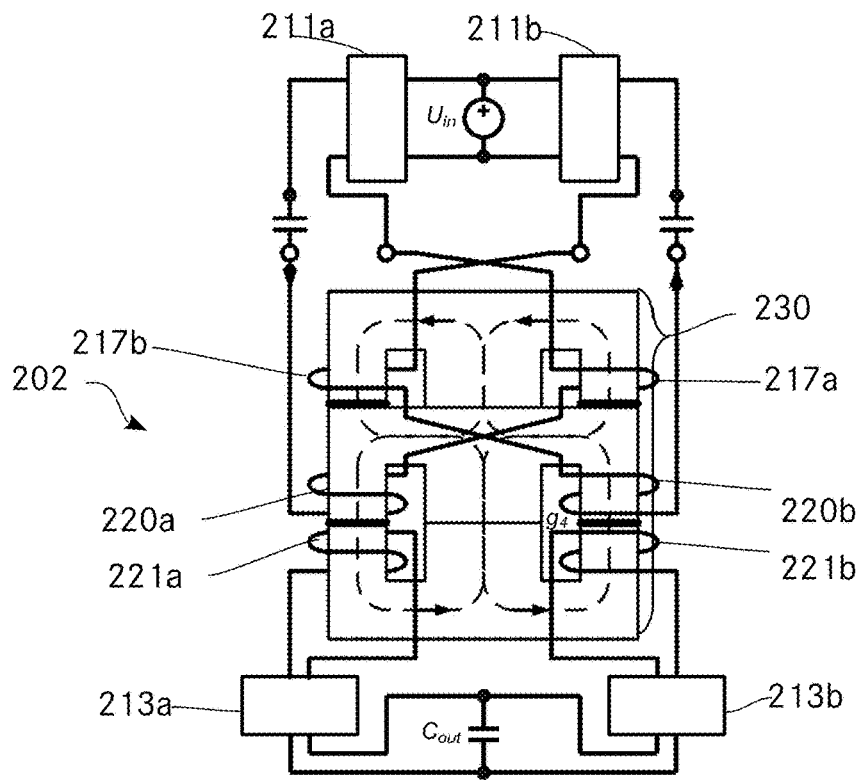
FIGS. 8a, 8b shows another embodiment of the integrated magnetic component according to the invention where the transformer windings and the choke winding of a LLC converter are wound on different windings carrying legs.

The second embodiment of the power converter according to the invention shown in FIG. 8a is similar to the power converter shown in FIGS. 5a and 5b. The integrated magnetic component 202 of this embodiment of the invention has a similar magnetic core structure 230 as the magnetic core structure according to FIG. 5b. It also comprises a first switching converter 211a and a first output rectifier 213a for the first LLC converter and a second switching converter 211b and a second rectifier 213b for the second LLC converter. To reduce core losses however, the first choke winding 217a of the first LLC converter is wound on a winding carrying leg which is different from the winding carrying leg, where the first primary winding 220a and the second secondary winding 221a of the first LLC converter are wound, the winding of said first choke winding 217a and the winding of said first primary winding 220a being connected in series. Also, the second choke winding 217b of the second LLC converter is wound on a winding carrying leg which is different from the winding carrying leg, where the second primary winding 220b and the second secondary winding 221b of the same LLC converter are wound, the winding of said second choke winding 217b and the winding of said second primary winding 220b being connected in series.

Figure 8B:
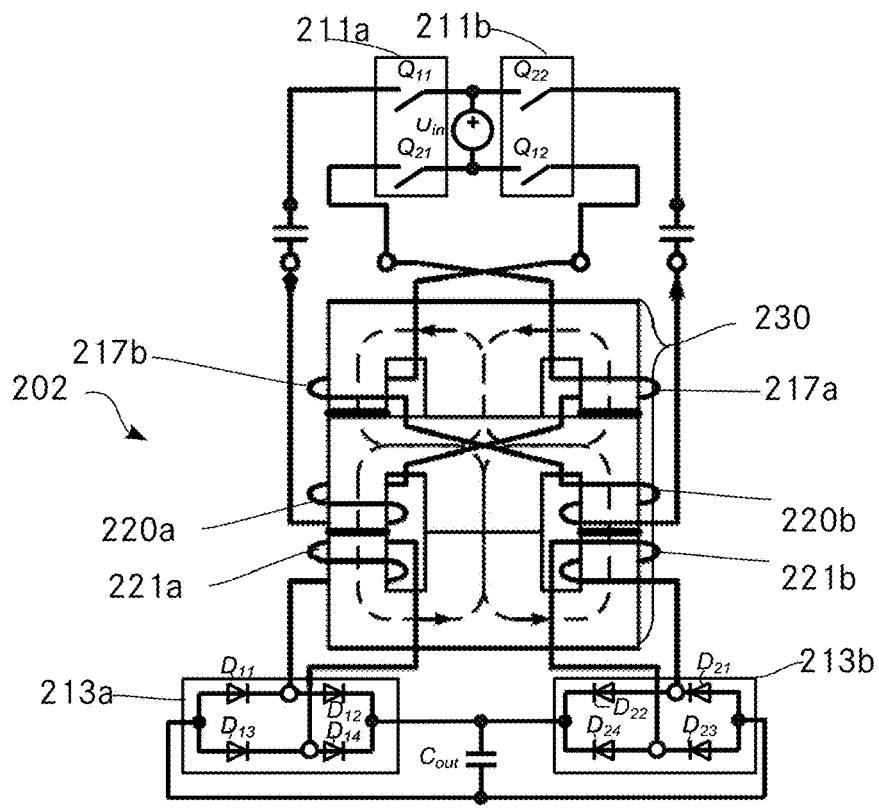

FIG. 8b is another representation of the power converter according to FIG. 8a, however showing the first and the second switching converter 211a and 211b and the first and second output rectifier 213a and 213b according to FIG. 8a, in a more detail. The first switching converter 211a includes two switches Q11 and Q21 and second switching converter 211b includes the switches Q12 and Q22. The switches generate from the DC-voltage at the input a square wave output voltage at the input of the first and the second LLC converter. The first secondary winding 221a is connected to the inputs of the first output rectifier 213a, the rectifier being a passive full-bridge rectifier comprising the four diodes $D_{11}$, $D_{12}$, $D_{13}$ and $D_{14}$. The second secondary winding 221b is connected to the inputs of a second output rectifier 213b, also being a passive full-bridge rectifier comprising the four diodes $D_{21}$, $D_{22}$, $D_{23}$ and $D_{24}$. The outputs of both rectifiers being connected in parallel to the output filter capacitor $C_{out}$.

Figure 9A:
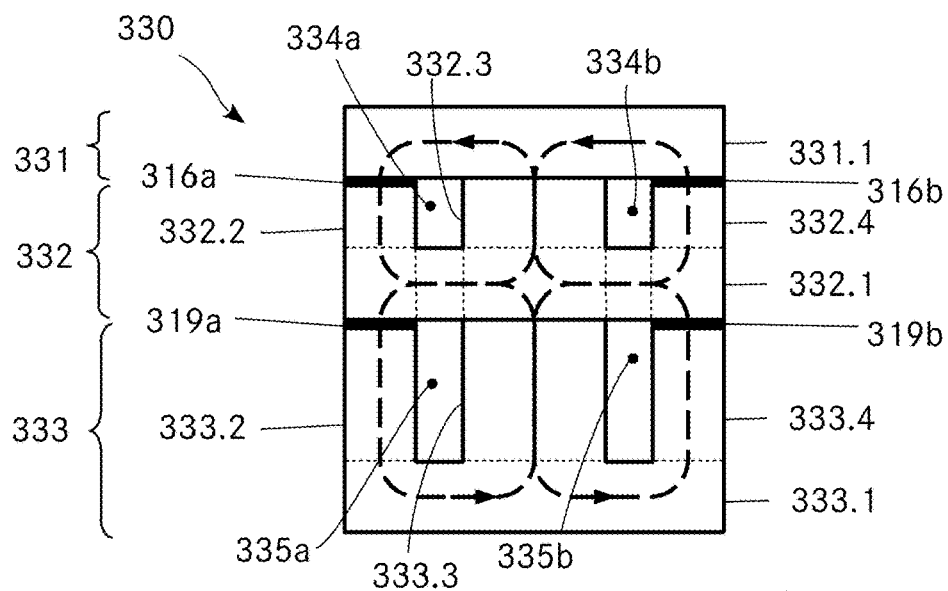
FIGS. 9a-9c depict three alternative embodiments of the core structure shown in FIG. 5b.
Figure 9B:
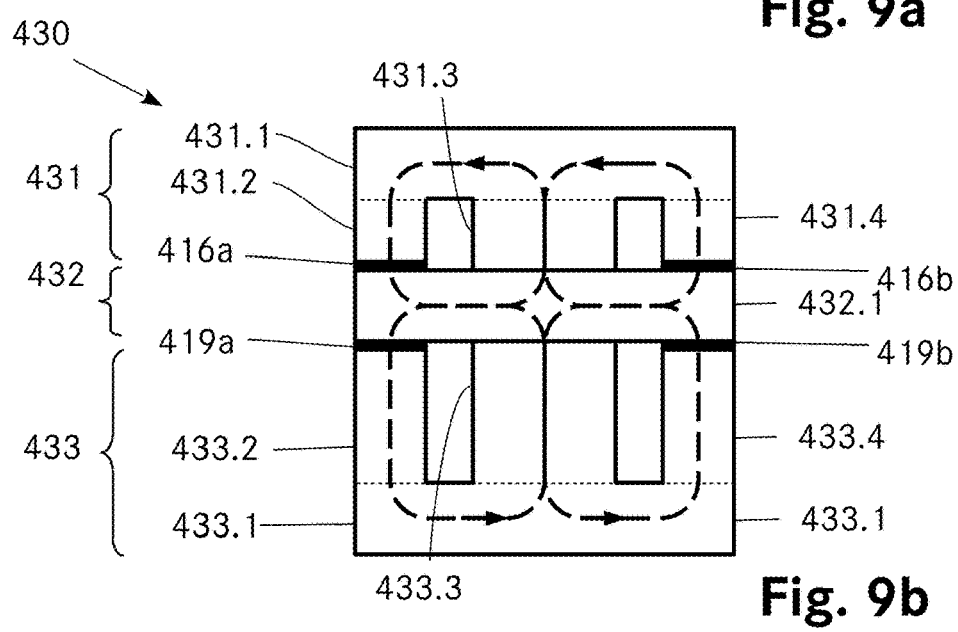
Figure 9C:
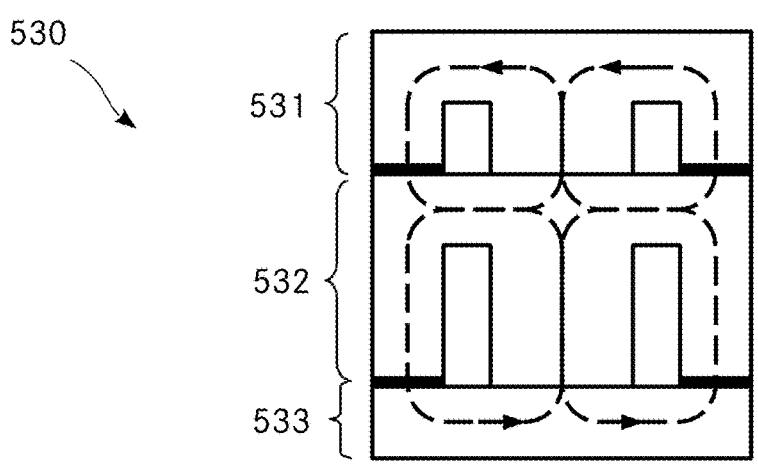

FIGS. 9a-9c depict three alternative embodiments of the core structure shown in FIG. 5b.

The magnetic core structure 330 according to FIG. 9a comprises a plate core 331, a first E-core 332 and a second E-core 333, a plate core being a special form of an I-core. The plate core 331 comprises a single flange 331.1, which forms the first yoke of the core structure 330. Both S-cores 332 and 333 comprise a flange 332.1 respectively 333.1, a first outer leg 332.2 respectively 333.2, a second outer leg 332.4 respectively 333.4 and an inner leg 332.3, respectively 333.3.

The plate core 331 is arranged on the legs of the first E-core 332 to form an 8-like shape. The plate core 331 and the first E-core 332 defining a first choke winding window 334a and a second choke winding window 334b. A first choke air gap 316a and a second choke air gap 316b are arranged between the plate core 331 respectively the first yoke 331.1 and the first and the second outer leg 332.2 and 332.4 of the first E-core 332.

The second E-core 333 abuts with its outer legs 333.2 and 333.4 and its inner leg 333.3 the flange 332.1 of the first E-core 332 on the side opposite of the legs of the first E-core 332. The flange 332.1 of the first E-core 332 and the second E-core 333 form an 8-like shape defining a first transformer winding window 335a and a second transformer winding window 335b.

A first transformer air gap 319a is arranged between the first outer leg 333. 2 of the second E-core 333 and the flange 332.1 of the first E-core 332, while a second transformer air gap 319b is arranged between the second outer leg 333.4 of the second E-core 333 and the flange 332.1 of the first E-core 332.

The first choke air gap 316a, the first outer leg 332.2 of the second E-core 332, the first filter air gap 319a and the first outer leg 333.2 of the second E-core 333 form the first winding carrying leg. Likewise, the second choke air gap 316b, the second outer leg 332.4 of the second E-core 332, the second filter air gap 319b and the second outer leg 333.4 of the second E-core 333 form the second winding carrying leg.

The section of the flange 332.1 between the first and the second winding carrying leg forms the third yoke.

The magnetic core structure 430 according to FIG. 9b is similar to the magnetic core structure 330 and also comprises a plate core 432 and a first and a second E-core 431 and 433. However in the magnetic core structure 430 the plate core 432 is arranged between the first E-core 431 and the second E-core 433.

Both E-cores 431 and 433 comprise a flange 431.1 respectively 433.1, a first outer leg 431.2 respectively 433.2, a second outer leg 431.4 respectively 433.4 and an inner leg 431.3, respectively 433.3. The flange 433.1 of the first E-core 431 forms the first yoke, the flange 433.1 of the second E-core 433.1 the second yoke. The first E-core 431 abuts with its legs the plate core 432 to define two choke winding windows. A first choke air gap 416a is arranged between the first outer leg 431.2 of the first E-core 431 and the plate core 432. A second air gap 416b is arranged between the second outer leg 431.4 of the first E-core and the plate core 432.

The plate core 432 comprises a single flange 432.1, which forms the third yoke of the core structure 430.

The second E-core 433 abuts with its legs on the side of the plate core which is opposite to the side where the plate core 432 abuts the legs of the first E-core 431. The plate core 432 and the second E-core 433 form two transformer winding windows. A first transformer air gap 419a is arranged between the plate core 432 and the first outer leg 433.2 of the second E-core 432 and the second transformer air gap 419b is arranged between the plate core 432 and the second outer leg 433.4 of the second E-core 433.

The magnetic core structure 530 according to FIG. 9c is similar to the magnetic core structure 330 and comprises also comprises a plate core 533 and a first and a second E-core 531 and 532. However in the magnetic core structure 530 the first E-core 531 is stacked with its legs on the flange of the second E-core 532 to define the two choke winding windows, whereas the second E-core 532 is stacked with its legs on the plate core 533 to define the transformer winding windows. The choke air gaps are arranged between the outer legs of the first E-core 531 and the flange of the second E-core 532 and the transformer air gaps are arranged between the outer legs of the second E-core 532 and the plate core 533.

All three core structures 330, 430 and 530 depicted in FIGS. 9a-9c may be modelled by means of the same reluctance according to FIG. 6 and basically differ by the arrangement of the air gaps. They all may be used to replace the core structure 130 according to FIG. 5b of the integrated magnetic component 102 in FIG. 5a or to replace the magnetic core structure of the integrated magnetic component 202 according to FIG. 8. The core structures according to FIGS. 5b, 9a-9c mainly differ by the arrangement of the air gaps.

Figure 10A:
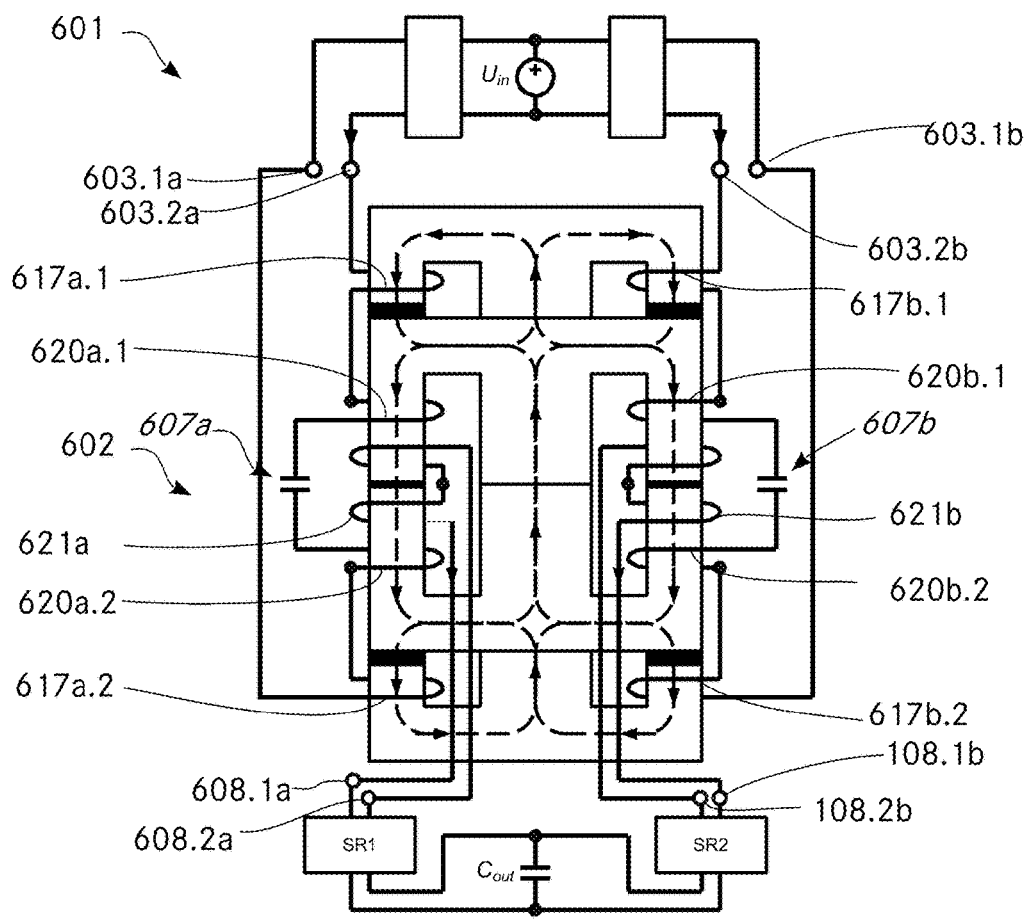
FIG. 10a shows a third embodiment of the inventive magnetic component, which includes a second choke winding per LLC converter.

FIG. 10a shows a third embodiment of the power converter 601. It differs from the power converter 102 according to FIG. 5a, by its integrated magnetic component 602. The integrated magnetic component 602 also comprises four inputs and four outputs, namely a first input of the first LLC converter 603.1a, a second input for the first LLC converter 603.2a, a first input of the second LLC converter 603.1b and a second input of the second LLC converter 603.2b. It further comprises a first output of the first LLC converter 608.1a, a second output of the first LLC converter 608.2a, a first output of the second LLC converter 608.1b and a second output of the second LLC converter 608.2b.

Figure 10B:
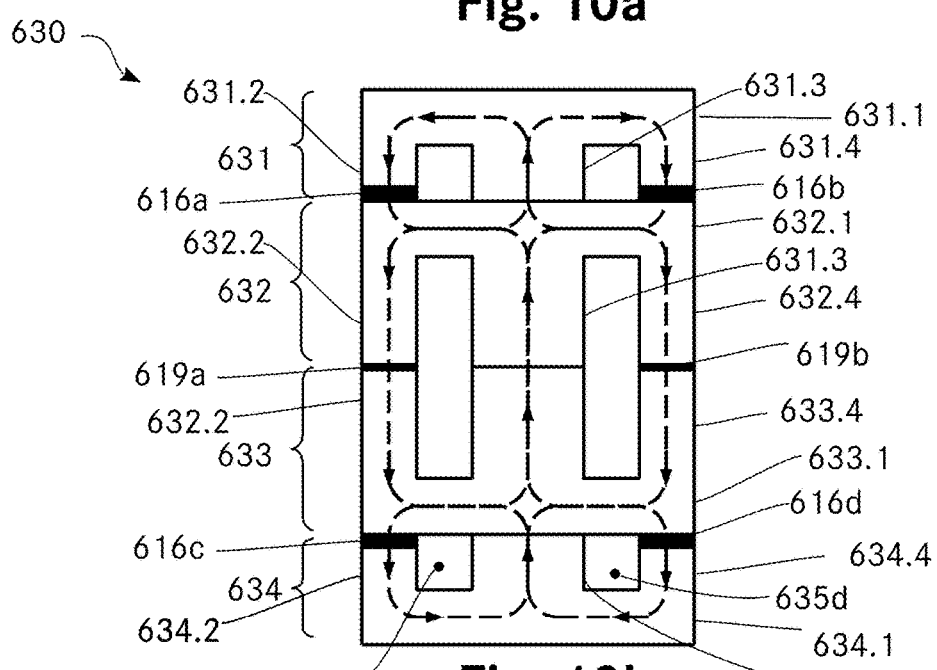

The magnetic core structure 630 of the integrated magnetic component 602 is depicted separately in FIG. 10b. In comparison to the core structure 130 (FIG. 5b) of the integrated magnetic component 102, the magnetic core structure 630 comprises 4 E-cores, namely a first E-core 631, a second E-core 632, a third E-core 633 and a fourth E-core 634. Each E-core comprises a flange, two outer legs and an inner leg. Those legs are arranged on the same side of the flange of the respective E-core. The first, the second and the third E-core are arranged in the same manner as shown in FIG. 5b. The fourth E-core 634 abuts with its first outer leg 634.2, its inner leg 634.3 and its second outer leg 634.4 the flange 633.1 of the third E-core 633 on the side opposite of the legs of the third E-core 633. In addition to the first and second choke air gaps 616a and 616b which are arranged between the outer legs 631.2 and 631.4 of the first E-core element 631 and the flange 632.1 of the second E-core element 632, the magnetic core structure 630 comprises a third choke air gap 616c, being arranged between the first outer leg 634.2 of the fourth E-core element 634 and the flange 633.1 of the third E-core 633, and a fourth choke air gap 616d being arranged between the second outer leg 634.4 of the fourth E-core 634 and the flange 633.1 of the third E-core. The flange 633.1 of the third E-core 633 and the flange 634.1 the fourth E-core 634 are defining a third choke winding window 635c and a fourth choke winding window 635d.

The first (second) outer leg 631.2 (631.4) of the first E-core element 631, the first (second) choke air gap 616a (616b), the first (second) outer leg 632.2 (632.4) of the second E-core 632, the first (second) transformer air gap 619a (619b), the first (second) outer leg 633.2 (633.4) of the third E-core 633, the third (fourth) choke air gap 616c (616d) and the first (second) outer leg 634.2 (634.4) of the fourth E-core 634 form a first (second) winding carrying leg.

Similarly, the first inner leg 631.3 of the first E-core 631, the inner leg 632.3 of the second E-core 632, the inner leg 633.3 of the third E-core 633 and the inner leg 634. 3 of the fourth E-core 634 define a return leg which is arranged in parallel the winding carrying leg.

The flange 631.1 of the first E-core 631 defines the first yoke, the flange 632.2 of the second E-core 632 defines the third yoke, the flange 633.1 of the third E-core 633 defines the fourth yoke and the flange 634.1 of the fourth E-core 634 defines the second yoke, the yokes magnetically connecting the winding carrying paths and the return path.

The arrangement of the windings of the integrated magnetic component 602 is depicted in FIG. 10a. The first primary winding of the first LLC converter is split in a first primary winding part 620a.1 and a second primary winding part 620a.2 and the second primary winding is split in a third primary winding part 620b.1 and a fourth primary winding part 620b.2. The winding parts 620a.1 and 620a.2 of the first primary winding and the first secondary winding 621a are arranged on the first winding carrying leg in a section between the third and the fourth yoke respectively the flange 632.1 of the second E-core and the flange 633.1 of the third E-core 633. The winding parts 620b.1 and 620b.2 of the second primary winding and the second secondary winding 621b are arranged on the second winding carrying leg, also in a section between the third and the fourth yoke respectively the flange 632.1 of the second E-core and the flange 633.1 of the third E-core 633.

The first choke winding is split in a first choke winding part 617a.1 and a second choke winding part 617a.2. Said first choke winding part 617a.1 is arranged on a section of the first winding carrying leg which is situated between the first yoke and the third yoke, and the second choke winding part 617a.2 is arranged on the first winding carrying leg in a section between the fourth yoke and the second yoke.

Similarly, the second choke winding is split in a third choke winding part 617b.1 and a fourth choke winding part 617b.2. Said third choke winding part 617b.1 is arranged on a section of the second winding carrying leg which is situated between the first yoke and the third yoke, and said second choke winding part 617b.2 is also arranged on the second winding carrying leg, but on a section between the fourth yoke and the second yoke.

The second choke winding part 617a.2 is connected with one end to the first input of the first LLC converter 603.1a and with the other end to the second primary winding part 620a.2. In turn, the second primary winding part 620a.2 is connected with its other end to the series capacitor 607a of the first LLC converter and said series capacitor 607a with its other end to the first primary winding part 620a. 1. The first primary winding part 620a.2 is connected with its other end to the first choke winding part 617a.1, which itself is connected to the second input 603.2a of the first LLC converter.

The fourth choke winding part 617b.2 is connected with one end to the first input 603.1b of the second LLC converter and with the other end to the fourth primary winding part 620b.2. Said fourth primary winding part 620b.2 is connected with its other end to the series capacitor 607b of the second LLC converter. The latter series capacitor 607b is connected with the other end to the third primary winding part 620b.1, which on its turn is connected with the other end to the third choke winding part 617b.1, which itself is connected to the second input 603.2b of the second LLC converter.

The first secondary winding 621a is connected to the first output 608.1a and the second output 608.2a of the first LLC converter and the second secondary winding 621b to the first output 608.1b and the second output 608.2b of the second LLC converter.

Splitting the choke air gaps in the two smaller air gaps 616a and 616c respectively 616b and 616d reduces air gap fringing and therefore air gap losses. In addition, by splitting the choke windings in two winding parts and by splitting the primary windings in two parts, also the symmetry on the primary sides of the transformer can by increased, yielding to a better performance of the magnetic component.

Figure 11A:
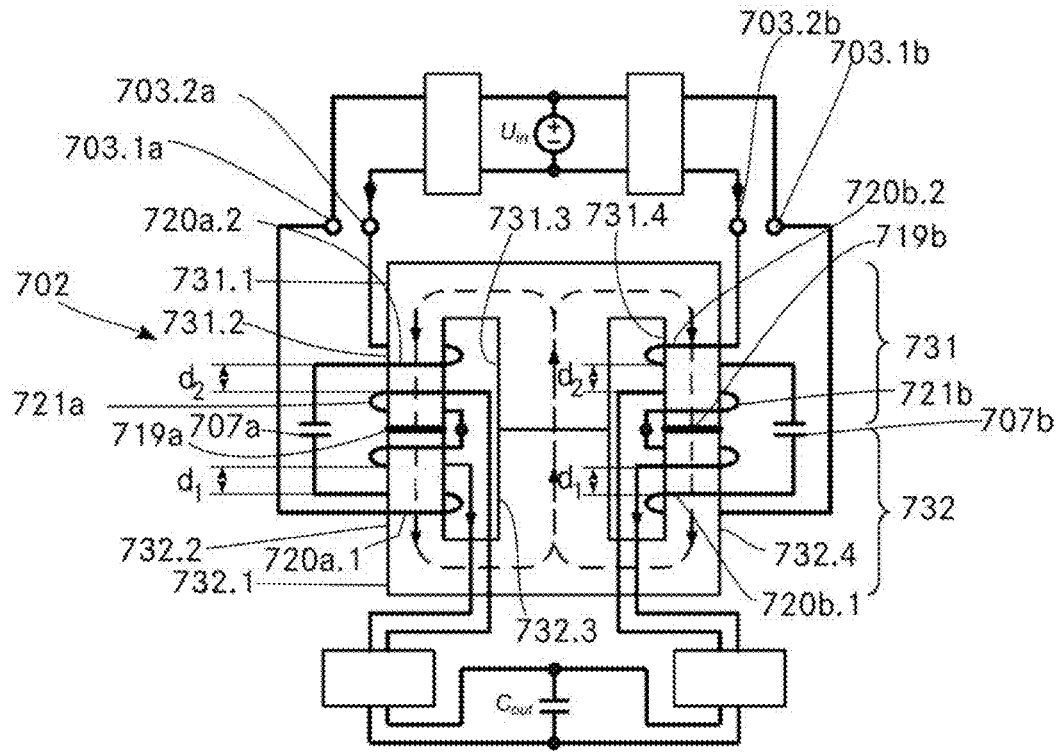
FIG. 11a shows a fourth embodiment of the inventive magnetic component, wherein the series inductance of each LLC converter is achieved by separating its primary winding and its secondary winding.

FIG. 11a shows a fourth embodiment of the invention including another variation of inventive integrated magnetic component 702. Instead of defining the series (resonant) inductance of the first and the second LLC converter by providing an extra closed magnetic flux path, the leakage flux is achieved by separating the primary winding and the secondary winding of both transformers.

This embodiment comprises a first E-core 731 with a flange 731.1, a first outer leg 731.2, an inner leg 731.3 and a second outer leg 731.4, and a second E-core 732, with a flange 732.1, a first outer leg 732.2, an inner leg 732.3 and a second outer leg 732.4. The two E-cores 731 and 732 are abutting each other with their legs and form an 8-shaped magnetic core structure. A first transformer air gap 719a is arranged between the first outer leg 731.2 of the first E-core 732 and the first outer leg 732.2 of the second E-core 732. A second transformer air gap 719b is arranged between the second outer leg 731.4 of the first E-core 731 and the second outer leg 732.4 of the second E-core 732. No air gap is provided in the magnetic path defined by the first inner leg 731.3 and the second inner 732.3. The flange 731.1 of the first E-core 731 defines a first yoke and the flange 732.1 of the second E-core 732 defines a second yoke. The first outer leg 731.2 of the first E-core 731, the first transformer air gap 719a and the first outer leg 732.2 of the second E-core 732 define the first winding carrying leg connecting the first and the second yoke. The second outer leg 731.4 of the first E-core 731, the second transformer air gap 719b and the second outer leg 732.4 of the second E-core 732 define the second winding carrying leg connecting the first and the second yoke in parallel to the first winding carrying leg. The first inner leg 731.3 of the first E-core 731 and the inner leg 732.3 of the second E-core 732 define the return leg, also connecting the first and the second yoke in parallel to the winding carrying legs, while being arranged in between them.

The primary winding of the first (second) LLC converter in split in a first (third) primary winding part 720a.1 (720b.1) and a second (fourth) primary winding part 720a.2 (720b.2), both winding parts being arranged on the first (second) winding carrying leg. The first (second) series capacitor 707a (707b) of the first (second) LLC converter is connecting the first (third) primary winding part 720a.1 (720b.1) and the second (fourth) primary winding part and 720a.2 (720b.2), the series connection of the first (third) primary winding part 720a.1 (720b.1), the first (second) series capacitor 707a (707b) and of the second (fourth) primary winding part 720a.2 (720b.1) is connected between the first input of the first (second) LLC converter 703.1a (703.1b)

and the second input of the first (second) LLC converter 703.2a (703.2b). The first (second) secondary winding 721a (721b) of the first (second) LLC converter is also arranged on the first (second) winding carrying leg, and is arranged between the first (third) primary winding part 720a.1 and the second (fourth) primary winding part 720a.2 (720b.1 and 720b.2) and distanced from this first (third) primary winding part 720a.1 (720b.1) by a first gap d1 and from this second (fourth) primary winding part 720a.2 (720b.2) by a second gap d2, wherein the first and the second gap d1 and d2 are preferable equal.

By varying the gaps d1 and d2 between the primary winding parts and the secondary windings of each LLC converter, a leakage inductance $L_{IP}$ which corresponds to the series inductances $L_{ra}$ or or $L_{rb}$ at the primary side of the LLC transformers can be defined, without requiring recurring to an additional choke winding and a separate choke flux path as for instance the choke flux paths 150a and 150b according to FIG. 5a.

While in this embodiment the gaps between the primary windings and the secondary windings are achieved by laterally distancing the windings, the gap can also be achieved when using transformer windings which are concentrically arranged in respect to each other, by concentrically distancing the windings, as described below.

Figure 11B:
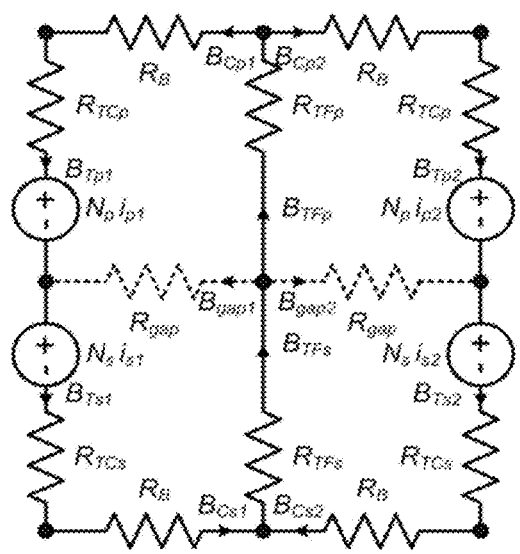
FIG. 11b illustrates the reluctance model of the integrated magnetic component according to FIG. 11b.

FIG. 11b illustrates the reluctance model of the integrated magnetic component 702 according to FIG. 11a.

The reluctance of the two flanges 731.1 and 732.1 of the E-cores 731 and 732 are considered to be identical and each flange being represented by a flange reluctance $R_B$.

The reluctance of the first respectively the second winding carrying leg, which includes the reluctance of the first outer legs 732.2 and 733.2 respectively the reluctance of the second outer legs 732.4 and 733.4 and the reluctance of the first transformer air gap 719a, respectively the reluctance of the second transformer air gap 719b, is modelled by a series connection of a transformer primary reluctance $R_{TCp}$ and transformer secondary reluctance $R_{TCs}$. The reluctance of the return leg is modelled by a series connection of a primary return reluctance $R_{TFp}$ and secondary return reluctance $R_{TFs}$. The first and the second leakage inductance, both due to the gap between the primary winding and the secondary winding of the respective LLC converter is considered by an air gap reluctance $R_{gap}$ being connected to a tap between the transformer primary reluctance $R_{TCp}$ and the transformer secondary reluctance $R_{TCs}$ of the respective winding carrying leg and a tap between the primary return reluctance $R_{TFp}$ and the secondary return reluctance $R_{TFs}$.

$i_{p1}$ is the current through the first and second primary winding part 720a.1 and 720a.2 and $N_p$ the winding number of both winding parts. $I_{p2}$ is the current through the third and fourth primary winding parts 720b.1 and 720b.2, $N_p$ is the winding number of both primary winding parts. $N_s$ is the winding number of the secondary windings. $I_{s1}$ is the current through the first secondary winding 721a and $I_{s2}$ is the current through the second secondary winding 721b. $B_{Tp1}$ und $B_{Tp2}$ designate the flux densities of the magnetic fluxes through the transformer primary reluctances $R_{TCp}$ and $B_{S1}$ und $B_{S2}$ the flux densities of the magnetic fluxes through the transformer secondary reluctances $R_{Ts1}$ and $R_{Ts2}$. Likewise, $B_{TFp}$ und $B_{TFs}$ stand for the flux densities of the magnetic fluxes in the primary and the secondary return path and $B_{Gap}$ for the flux density of the magnetic flux due to the leakage flux caused by the gap between the primary and the secondary windings of the transformer. $B_{Cs1}$, $B_{Cs2}$, $B_{Cp1}$, and $B_{Cp2}$ stand for the flux densities of the magnetic fluxes in the flanges.

FIGS. 12a and 12b illustrate the calculation of the leakage inductance on the example of a simplified model of a transformer.

FIG. 12a depicts a cross section of a rotationally symmetric, conventional wound transformer with the MMF (Magneto Motif Force) curve. The primary winding 20 and the secondary winding 21 being arranged in a concentric manner, where the primary winding 20 with the winding turn number $N_1$ is wound around the secondary winding 21 with the winding number $N_2$, the gap between the primary winding and the secondary winding being $h_1$.

FIG. 12b illustrates a cross section of a rotationally symmetric planar transformer. The primary winding 20 and the secondary winding 21 being arranged in parallel, the gap between the primary winding 20 and the secondary winding 21 being m $h_1$.

The leakage inductance $L_{IP}$ for both transformer types at the primary side of the transformer can be calculated using the following formula:

$$L_{IP} \approx \frac{\mu_0}{b_W \cdot I_p^2} \cdot \left(\sum_k S_k \cdot I_{rms,k}^2\right) \approx$$

$$\frac{\mu_0 \cdot N_1^2}{b_W} \cdot \left(\frac{h_P \cdot MLT_P + 3 \cdot h_I \cdot MLT_I + h_S \cdot MLP_S}{3}\right),$$

Where $S_k$ is the surface of winding or air gap, $I_{rms,k}$ its RMS current value, $N_1$ is the primary turn number. $h_P$, $h_I$, and $h_S$ are respectively height of the primary winding, of the gap between primary and secondary and of the height of the secondary winding $MLT_P$, $MLT_I$, and $MLT_S$ are the respective mean length turn. $b_W$ is the width of the windings and $\mu_0$ is the air permeability.

The separation respectively the gap between primary and secondary winding in order achieve leakage inductance vary from 0.5 mm to about 10 mm depending on shape and size of the ferrite core used.

FIG. 13 depicts a power converter 801 which in many aspects similar to the power converter 101 depicted in FIG. 5a. However the power converter 801 integrates three interleaved LLC converters, which are preferable adapted for interleaved operation with a phase shift of 120°. The power converter 801 comprises a first LLC resonant converter with a first switching converter 811a, a first output rectifier 813a and a first resonant capacitor 807a, a second LLC resonant converter with a second switching converter 811b, a second output rectifier 813b and a second resonant capacitor 807b and a third LLC resonant converter with a third switching converter 811c, a third output rectifier 813c and a third resonant capacitor 807c. The integrated magnetic component 802 of the power converter 801 includes a single magnetic core structure 830 with three five-leg cores: A first W-core 831, a second W-core 832 and a third W-core 833. Each of the W-cores comprises a flange and five legs which are arranged in parallel on a side of the flange. Said W-cores are arranged in a similar manner as the E-cores of the magnetic core structure 130 according to FIG. 5b: The first W-core 831 abuts the flange of the second E-core on the side opposite to the legs of the second W-core 832, said two W-cores forming four choke winding windows. The legs of the second W-core 832 abut the legs of the third W-core 833, the second and the third W-core 832 and 833 thus forming four transformer winding windows.

The two more legs of the W-cores 831, 832 and 833 in magnetic core structure 830 in comparison to the E-cores according to FIGS. 5a and 5b provide a third winding carrying leg 861c and a second return leg 860b. The first return leg 860a is neighboured by the first winding carrying leg 861a and the second winding carrying leg 861b and the second return leg 860b by the second winding carrying leg 861b. The flange of the first W-core 831 defines a first yoke, the flange of the second W-core 832 a third yoke and the flange of the third W-core defines the second yoke, the yokes magnetically interconnecting the three winding carrying legs (N=3) and the two return legs.

The primary and the secondary windings of the first two LLC transformers are arranged in a similar manner as in the embodiment according to FIG. 5a, namely on the transformer section of the first respectively the second winding carrying leg, between the third yoke and the second yoke. The choke windings are arranged on the respective choke sections of the winding carrying between the first yoke and the third yoke.

The integrated magnetic component 830 comprises a third primary winding 820c, which is split two primary winding parts, a third secondary winding 821c and a third choke winding 817c, which are arranged in a similar manner on the third winding carrying leg as the corresponding windings of the first and the second LLC converter on their respective legs, the transformer windings being arranged on transformer sections of the winding carrying legs, whereas the choke winding being arranged on the choke winding section.

The choke air gaps 816 and the transformer air gaps 819 are all arranged on the winding carrying legs. Hereby the choke air gaps are arranged between the outer legs of the first W-core 831 and the third yoke and between the middle leg of the first W-core 831 and the third yoke. The return legs are gap free. The transformer gaps are arranged between the outer legs of the second W-core 831 and the third W-core 832 and between the middle legs of the second W-core 832 and the third W-core 833. The return legs are gap free.

The integrated magnetic component 802 further comprises two inputs for every LLC converter and two outputs for every LLC converter.

Figure 14:
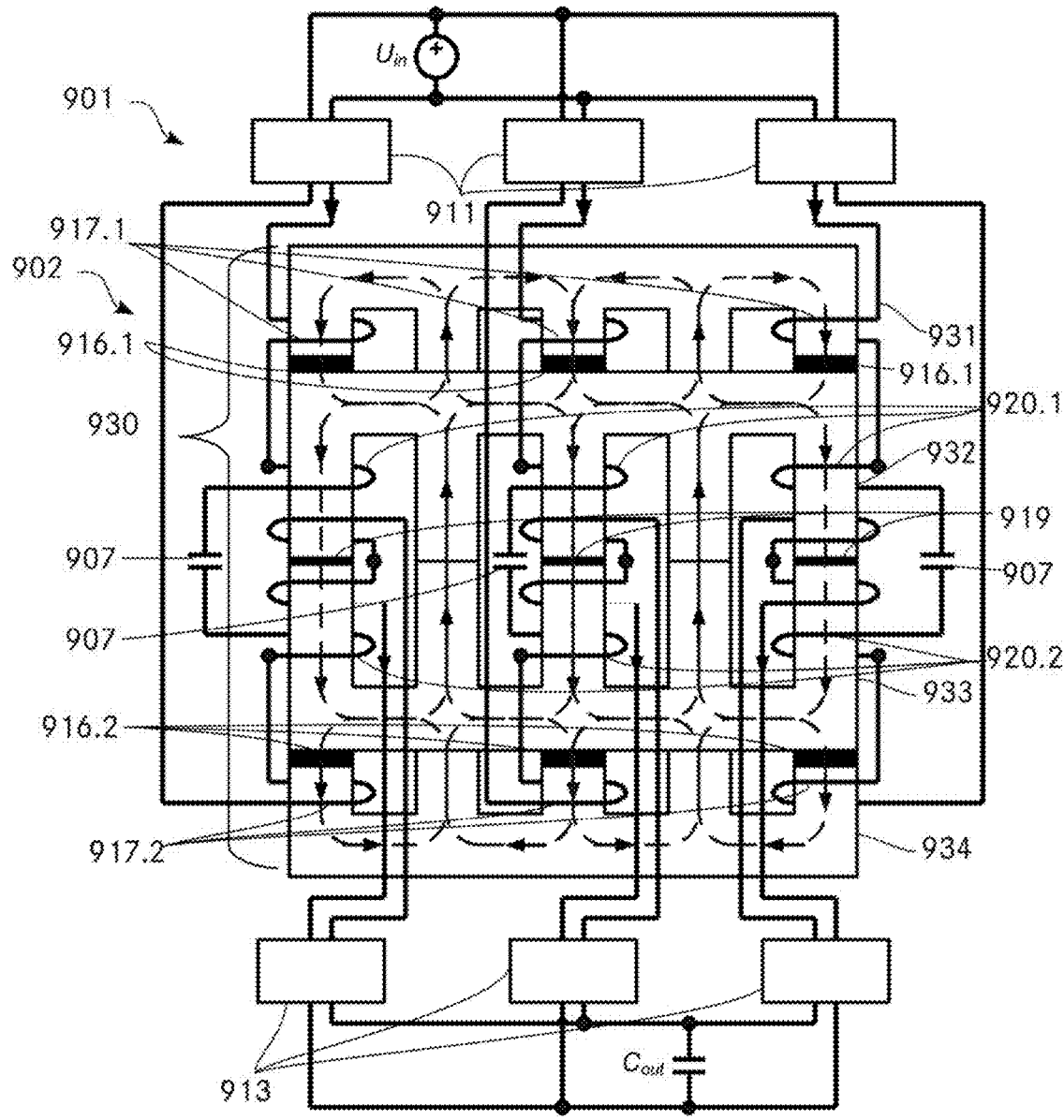
FIG. 14 depicts a power converter with another embodiment of the inventive integrated magnetic component, which integrates the magnetic components of three LLC converters, the LLC converters having split resonant chokes.

FIG. 14 shows a power converter 901 with three LLC converters, each having a switching converter 911, an output rectifier 913 and a series capacitor 907. The integrated magnetic component 902 of this embodiment integrates all magnetic components of the three LLC converters and includes three transformers with primary and secondary windings and three choke windings. The integrated magnetic component 902 is similar to the integrated magnetic component 802 according to FIG. 13, but combines a fourth W-core similar as the embodiment of FIG. 10a combines the magnetic core structure according to FIG. 5b with a fourth E-core. Adding of a fourth W-core 934 allows splitting the choke air gap of every LLC converter into a first choke air gap 916.1 and a second choke air gap 916.2 and the choke windings into a first choke winding part 917.1 and a second choke winding part 917.2. Also similar to the embodiment according to FIG. 10, also in this embodiment the primary windings are split in a first primary winding part 920.1 and a second primary winding part 920.2.

The magnetic core structure 930 of the integrated magnetic component 902 comprises three winding carrying legs and two return legs, wherein each return leg is neighboured by two winding carrying legs. Each winding carrying leg comprises a transformer section where the transformer windings are wound and which includes a transformer air gap 919. It also includes a first and a second choke section. The first choke section carries the first choke winding part 916.1 and includes the first choke air gap 916.1 and the second choke section carries the second choke winding part 916.2 and includes the second choke air gap 916.2, similar as presented in the description of FIG. 10a. The winding carrying legs and the return leg, all legs being arranged in parallel, are interconnected by four parallel magnetic paths: a first and a second path are constituted by a first and a second yoke, being defined by the flanges of the first W-core 931 and the fourth W-core 934. A third path is provided by a third yoke, being defined by the flange of the second W-core 932, and a fourth path is provided by a fourth yoke, being defined the flange of the third W-core 933. No air gap is provided on the return legs.

Splitting the choke air gaps in two smaller air gaps reduces air gap fringing and therefore air gap losses. In addition, by splitting the choke windings in two winding parts and also by splitting the primary windings in two parts, also the symmetry on the primary sides of the transformer can by increased, yielding to a better performance of the magnetic component.

Figure 15:
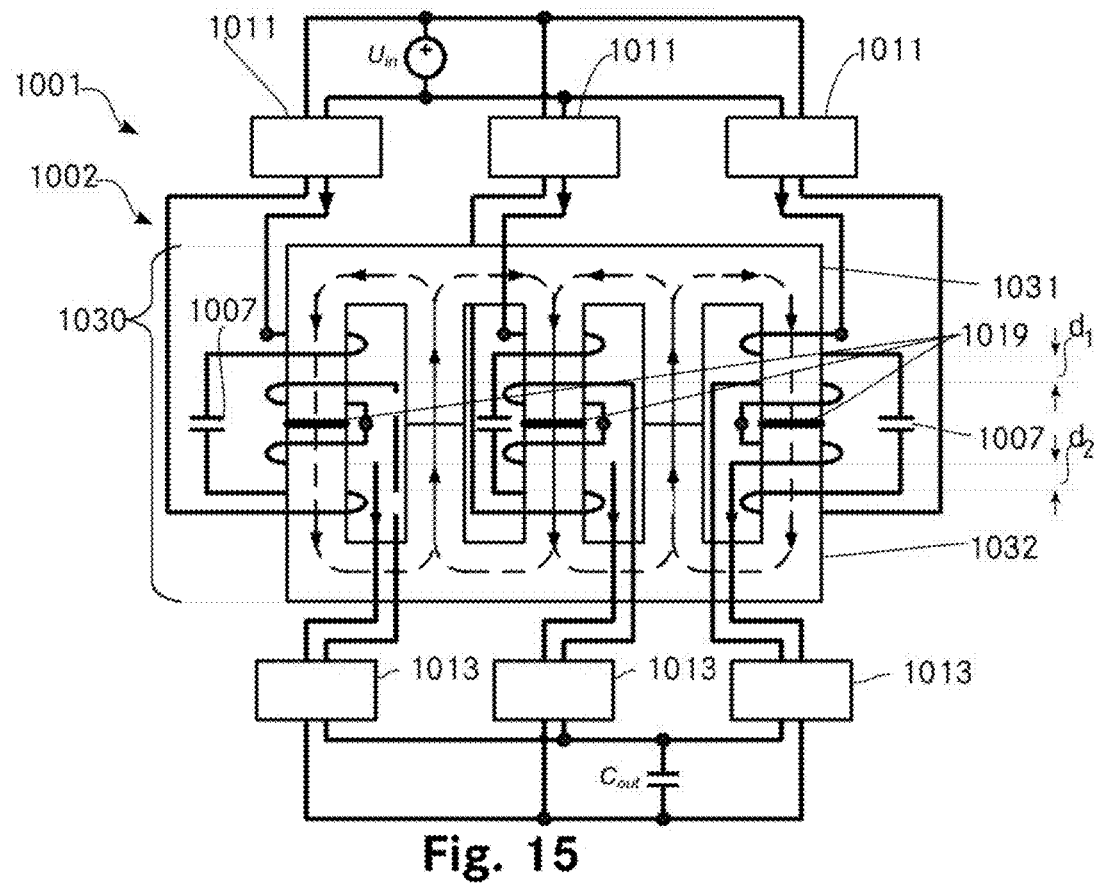
FIG. 15 also depicts a power converter with an inventive integrated magnetic component which integrates the magnetic components of three LLC converters, wherein the series inductance of each LLC converter is achieved by separating its primary winding and its secondary winding.

FIG. 15 is an illustration of a further power converter 1001 which integrates three interleaved LLC converters which are preferable adapted for interleaved operation with a phase shift of 120°. The power converter 1001 comprises for each of the three LLC resonant converter a switching converter 1011, an output rectifier 1013 and a resonant capacitor 1007, a first and a second input and a first and a second output. The power converter 1001 further comprises a single integrated magnetic component 1002. The integrated magnetic component 1002 implements all magnetic components of the three LLC converters and includes a single magnetic core structure 1030 which comprises two five-leg cores: A first W-core 1031 and second W-core 1032, both W-cores comprising a flange and five legs which are arranged in parallel on a side of the flange. Said W-cores are arranged in a similar manner as the E-cores of the magnetic core structure 730 according to FIG. 11a: The legs of the first W-core 1031 abut the legs of the second W-core 1032, the first and the second W-core 1031 and 1032 thus forming four transformer winding windows.

The magnetic core structure 1030 of the integrated magnetic component 1002 comprises three winding carrying legs and two return legs, wherein each return leg is neighboured by two winding carrying legs. The winding carrying legs are formed by the two abutting legs of the W-cores, one of the first W-core 1031 and the other one of the second W-core 1032, and a transformer air gap 1019 being arranged between the two abutting legs. The return legs are essentially air gap free.

The integrated magnetic component 1002 comprises for each of the three LLC converter a primary winding and secondary winding, defining the magnetic components of the respective LLC converter.

Each primary winding is wound on one of the winding carrying legs, wherein the primary windings are split in a first primary winding part and a second primary winding part. For each LLC converter the series capacitor 1007 of the respective LLC converter is arranged to connect the first and the second primary winding part. The secondary winding of the respective LLC converter is arranged on the same winding carrying leg, in between the first and the second primary winding part and distanced from the first primary winding part by a first gap d1 and from this second primary winding part by a second gap d2, wherein the first and the second gap d1 and d2 are preferable equal.

By varying the gap between the primary winding parts and the secondary winding parts of a LLC converter, a leakage inductance $L_{lP}$ respectively the series inductance at the primary side of the LLC transformers can be defined, without requiring recurring to choke winding and a separate choke flux path, for instance by the approximation method described in relation FIGS. 12a and 12b.

The integrated component according to FIG. 15 is similar to the integrated magnetic component depicted in FIG. 11a, with the difference that the integrated magnetic component is extended by two additional legs for implementing a third LLC converter. It is to be mentioned, that the component can be extended by further legs in order to implement more than three LLC converters.

Figure 16:
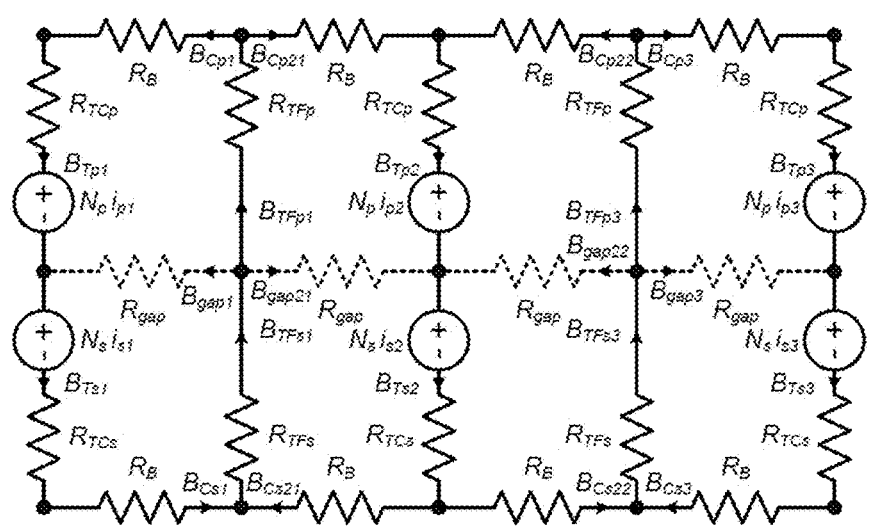
FIG. 16 illustrates the reluctance model of the integrated magnetic component according to FIG. 16.

FIG. 16 illustrates the reluctance model of the integrated magnetic component 1002 according to FIG. 16.

The reluctance of the flange section between the winding carrying legs and the return legs are considered to be identical and each flange section being represented by a flange reluctance $R_B$.

The reluctance of the winding carrying leg, which includes the reluctance of the abutting legs of the W-cores 1031 and 1032 and the reluctance of the respective transformer air gap 1019, is modelled by a series connections of a transformer primary reluctance $R_{TCp}$ and transformer secondary reluctance $R_{TCs}$, in accordance to the model of the integrated magnetic component 702 depicted in FIG. 11b, as the legs of this component are identical. Hence, the reluctance of the return leg is likewise modelled by a series connection of a primary return reluctance $R_{TFp}$ and a secondary return reluctance $R_{TFs}$. The leakage inductance, both due to the gap between the primary winding and the secondary winding of the respective LLC converter is considered by an air gap reluctance $R_{gap}$ being connected to a tap on the respective winding carrying leg between the transformer primary reluctance $R_{TCp}$ and the transformer secondary reluctance $R_{TCs}$ and a tap between the primary return reluctance $R_{TFp}$ and the secondary return reluctance $R_{TFs}$ of the return leg, being arranged adjacent to the respective winding carrying leg.

$i_{p1} \ldots i_{p3}$ are the currents through the primary winding parts of a respective LLC converter and $N_p$ the winding turn number of both primary winding parts, said winding turn number being the sum of the winding turns of both winding parts.

$i_{S1} \ldots i_{S3}$ are the currents through the second secondary windings of the respective LLC converters. $N_S$ is the winding turn number of the secondary windings. $B_{Tp1}$, $B_{Tp2}$ and $B_{Tp3}$ designate the magnetic flux densities in the core section where the primary windings are arranged, $B_{S1}$, $B_{S2}$ and $B_{S2}$ the magnetic flux densities in the core section where the secondary windings are arranged. $B_{TFp1}$ and $B_{TFp3}$ designate the flux densities in the return paths and $B_{Gap\ 1}$, $B_{Gap2}$, $B_{Gap\ 21}$ and $B_{Gap22}$ the flux densities due to the leakage flux caused by the gaps between the primary and the secondary windings of the transformer. $B_{Cp1}$, $B_{Cp21}$, $B_{Cp22}$, $B_{Cp3}$, $B_{Cs1}$ $B_{Cs21}$, $B_{Cs22}$, $B_{Cs3}$, stand for the flux densities in the flanges.

In summary, it is to be noted that the invention creates an integrated magnetic component converter including N>=2 LLC converters configured for interleaved operation with a reduced size, reduced losses, less stray inductances and amelioration of transient characteristics. The invention also creates a power converter including the integrated magnetic component according to the invention.

The invention claimed is:

1. Integrated magnetic component for a power converter including N>=2 LLC converters configured for interleaved operation, said integrated magnetic component includes
    a) a first yoke, and a second yoke and a third yoke,
    b) for each LLC converter, a winding carrying leg comprising a primary winding and a secondary winding, the primary winding and the secondary winding being wound on the respective winding carrying leg,
    c) the integrated magnetic component further includes one or more return legs,
    wherein the winding carrying legs and the one or more return legs are arranged side by side, each leg being magnetically connected to the first, the second and the third yoke, and wherein the winding carrying legs include a transformer air gap whereas the at least one return leg is air gap free
    wherein at least one return leg is arranged between two winding carrying legs,
    f) wherein the third yoke arranged between the first and the second yoke dividing each winding carrying leg in a transformer section and a first choke section,
    g) the first choke section of each winding carrying leg comprising a first choke air gap and a first choke winding for defining a first series inductance of a first series inductor of a LLC converter,
    h) the transformer section comprising the transformer air gap and the primary and the secondary winding, wherein:
    i) a fourth yoke dividing each transformer section in a second choke section and a sub-transformer section,
    j) the second choke section of each winding carrying leg comprising a second choke air gap and a second choke winding for defining a second series inductance of a second series inductor of a LLC converter,
    k) the sub-transformer section comprising the transformer air gap and the primary and the secondary winding.

2. The integrated magnetic component according to claim 1, comprising N−1 return legs where the winding carrying legs and the return legs are arranged side by side alternatingly.

3. The integrated magnetic component according to claim 1, wherein the integrated magnetic component is formed by a plurality of stacked core elements, wherein the stacked core elements are either multi-leg core elements or I-cores.

4. The integrated magnetic component according to claim 3, wherein N=2.

5. The integrated magnetic component according to claim 4, wherein the multi-leg core elements are E-cores.

6. The integrated magnetic component according to claim 3, wherein N=3.

7. The integrated magnetic component according to claim 3, wherein the transformer air gap of the winding carrying leg is arranged between a leg of a core element and a flange of a core element or between two legs of core elements which are abutting each other with their legs.

8. The power converter according to claim 7, wherein N=2.

9. The power converter according to claim 7 wherein N=3.

10. The integrated magnetic component according to claim 1, wherein the primary winding and the secondary winding on each winding carrying leg are spatially distanced from each other, to generate a flux leakage path, defining a series inductance of a series inductor of the respective LLC converter.

11. The integrated magnetic component according to claim 1, wherein the integrated magnetic component is formed by a plurality of stacked core elements, and wherein the plurality of stacked core elements comprises three multi-leg core elements or two multi-leg core elements and one I-core.

12. The integrated magnetic component according to claim 1, wherein the integrated magnetic component is formed by a plurality of stacked core elements, and wherein the plurality of stacked core elements comprises four multi-leg core elements or three multi-leg core elements and one I-core.

13. The integrated magnetic component according to claim 1, wherein the first choke winding of an LLC converter and the primary winding of the same LLC converter are realized with a single wire, the winding of said first choke winding and the winding of said primary winding being connected in series by said single wire.

14. The integrated magnetic component according to claim 1 wherein the first choke winding of an LLC converter is wound on a winding carrying leg different from the winding carrying leg, where the primary winding and the secondary winding of the same LLC converter are wound, the winding of said first choke winding and the winding of said primary winding being connected in series.

15. The integrated magnetic component according to claim 1, wherein the primary windings are split in a first primary winding part and a second primary winding part.

16. Power converter including a switching converter stage, a rectifier stage and a resonant stage, the resonant stage including N>=2 parallel LLC converters wherein a transformer, a parallel inductor and a series inductor of the LLC converters are formed by an integrated magnetic component according to claim 1.

\* \* \* \* \*